(12) United States Patent
Dahme

(10) Patent No.: US 10,908,124 B2
(45) Date of Patent: *Feb. 2, 2021

(54) METHODS AND APPARATUS TO GENERATE AN ACOUSTIC EMISSION SPECTRUM USING CHIRP DEMODULATION

(71) Applicant: Fisher Controls International LLC, Marshalltown, IA (US)

(72) Inventor: Bret Anthony Dahme, Marshalltown, IA (US)

(73) Assignee: FISHER CONTROLS INTERNATIONAL LLC, Marshalltown, IA (US)

(*) Notice: Subject to any disclaimer, the term of this patent is extended or adjusted under 35 U.S.C. 154(b) by 121 days.

This patent is subject to a terminal disclaimer.

(21) Appl. No.: 15/855,663

(22) Filed: Dec. 27, 2017

(65) Prior Publication Data

US 2019/0195833 A1    Jun. 27, 2019

(51) Int. Cl.
| | |
|---|---|
| *G01N 29/14* | (2006.01) |
| *G01N 29/42* | (2006.01) |
| *G01N 29/44* | (2006.01) |
| *G01N 29/34* | (2006.01) |

(52) U.S. Cl.
CPC .............. *G01N 29/14* (2013.01); *G01N 29/34* (2013.01); *G01N 29/348* (2013.01); *G01N 29/42* (2013.01); *G01N 29/44* (2013.01)

(58) Field of Classification Search
CPC ...... G01N 29/14; G01N 29/34; G01N 29/348; G01N 29/42; G01N 29/36; G01H 13/00
USPC .................................................. 73/587, 602
See application file for complete search history.

(56) References Cited

U.S. PATENT DOCUMENTS

| | | | |
|---|---|---|---|
| 2,418,750 | A | 4/1947 | Bliss et al. |
| 2,661,419 | A | 12/1953 | Tongue |
| 2,678,997 | A | 5/1954 | Darlington |
| 4,317,368 | A | 3/1982 | McElroy |
| 4,609,994 | A | 9/1986 | Bassim et al. |
| 4,843,885 | A | 7/1989 | Bambara |
| 5,477,730 | A | 12/1995 | Carter |

(Continued)

FOREIGN PATENT DOCUMENTS

| | | |
|---|---|---|
| CN | 101388877 | 3/2009 |
| EP | 0442207 A1 | 8/1991 |

OTHER PUBLICATIONS

International Searching Authority, "International Search Report," dated Mar. 1, 2019 in connection with International Patent Application No. PCT/US2018/063051 (6 pages).

International Searching Authority, "Written Opinion," dated Mar. 1, 2019 in connection with International Patent Application No. PCT/US2018/063051 (7 pages).

(Continued)

*Primary Examiner* — Stephen D Meier
*Assistant Examiner* — Rose M Miller
(74) *Attorney, Agent, or Firm* — Hanley Flight & Zimmerman, LLC

(57) ABSTRACT

Methods, apparatus, and articles of manufacture are disclosed. An example apparatus includes a pre-amplifier to condition an acoustic emission signal based on an acoustic emission source, a demodulator to generate demodulated acoustic emission data based on combining the acoustic emission signal with a chirp signal, and a transmitter to transmit the demodulated acoustic emission data to a data acquisition system.

21 Claims, 13 Drawing Sheets

(56) References Cited

U.S. PATENT DOCUMENTS

| | | | | |
|---|---|---|---|---|
| 6,014,896 | A * | 1/2000 | Schoess | G01H 1/003 73/583 |
| 6,679,119 | B2 * | 1/2004 | Board | G01H 1/003 702/56 |
| 2003/0030564 | A1 | 2/2003 | Boyce et al. | |
| 2010/0139403 | A1 * | 6/2010 | Liang | G01N 29/14 73/587 |
| 2011/0041611 | A1 | 2/2011 | Hofer et al. | |
| 2015/0330950 | A1 * | 11/2015 | Bechhoefer | G01N 29/46 73/587 |
| 2016/0047717 | A1 | 2/2016 | McGoogan | |
| 2017/0131240 | A1 * | 5/2017 | Aura | D21C 11/10 |

OTHER PUBLICATIONS

Qu Yongzhi et al., "Development of a New Acoustic Emission Based Fault Diagnosis Tool for Gearbox," IEEE Conference on Prognostics and Health Management (PHM), IEEE, Jun. 24, 2013, pp. 1-9 (9 pages).

Olhede et al., "A generalized demodulation approach to time-frequency projections for multicomponent signals," Department of Mathematics, Imperial College London, 2005, 20 pages.

Bechhoeffer et al., "Analog Signal Processing to Improve Acoustic Emissions Sensing," NRG Systems, Sep. 25, 2013, 13 pages.

Brandon Edward Van Hecke, "Development of Novel Acoustic Emission Based Methodology and Tools for Bearing Fault Diagnostics," University of Illinois at Chicago, 2015, 137 pages.

Atakishiyev et al., "Continuous vs. discrete fractional Fourier transforms," Journal of Computational and Applied Mathematics, 107, 1999, 23 pages.

Bultheel et al., "Computation of the fractional Fourier transform," Applied and Computational Harmonic Analysis, 16, 2004, 182-202, 21 pages.

Reddy S et al., "Multicomponent Chirp Demodulation Using Discrete Fractional Fourier Analysis," IEEE, 2006, 5 pages.

Narayanan et al., "The fractional Fourier transform: theory, implementation and error analysis," Microprocessors and Microsystems, 27, 2003, 511-521, 11 pages.

Schlanbusch et al., "Low Computation Acoustic Emissions Structural Health Monitoring Through Analog Signal Pre-Processing," Annual Conference of the Prognostics and Health Management Society, 2017, 7 pages.

United States Patent and Trademark Office, "Non-Final Office Action," issued in connection with U.S. Appl. No. 15/855,625, dated Jun. 28, 2019 (27 pages).

United States Patent and Trademark Office, "Final Office Action," issued in connection with U.S. Appl. No. 15/855,625, dated Jan. 10, 2020 (19 pages).

United States Patent and Trademark Office, "Advisory Action," issued in connection with U.S. Appl. No. 15/855,625, dated Mar. 17, 2020 (3 pages).

United States Patent and Trademark Office, "Non-Final Office Action," issued in connection with U.S. Appl. No. 15/855,625, dated May 15, 2020 (5 pages).

* cited by examiner

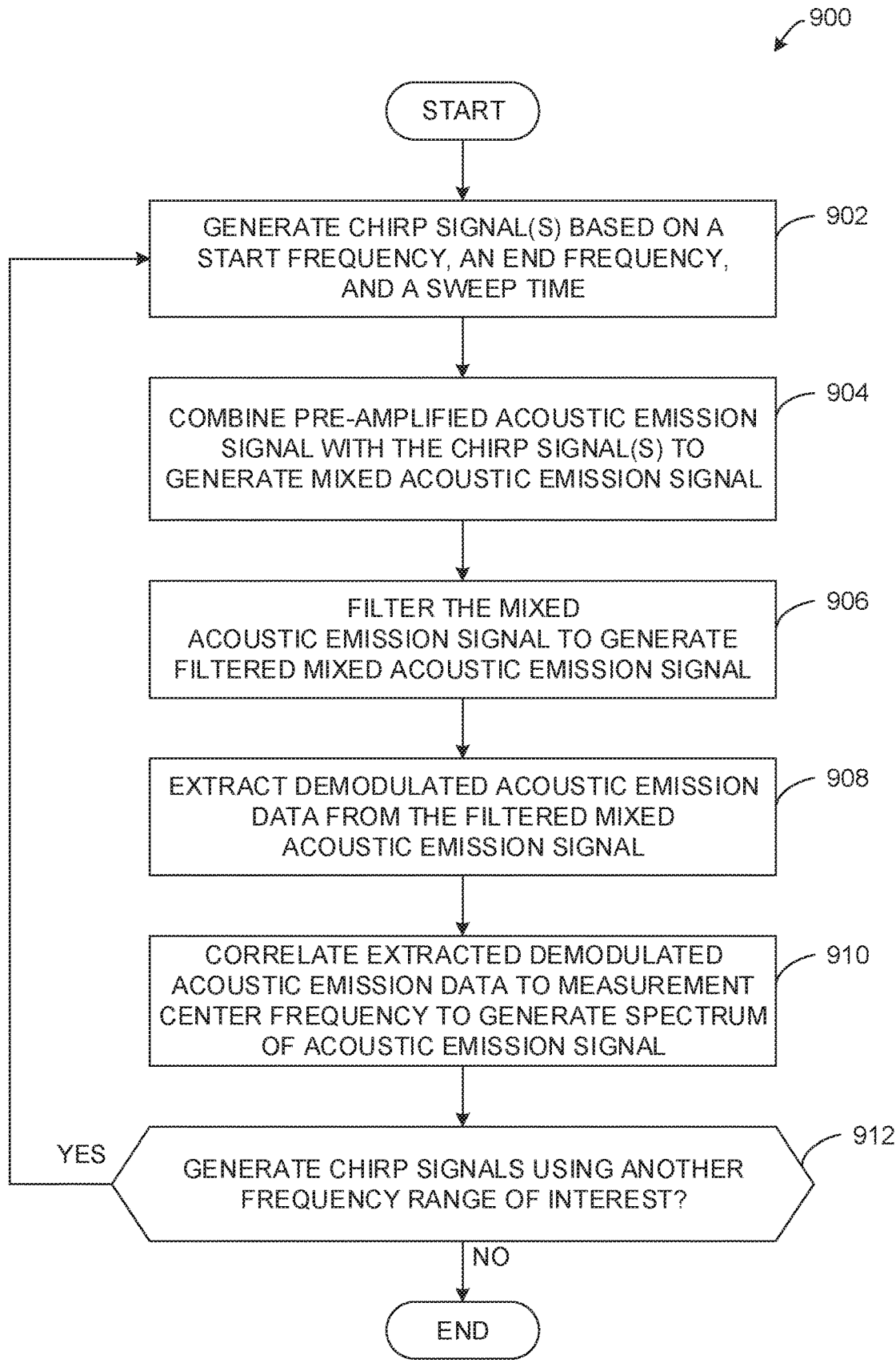

ic emission pre-amplifier of an example acoustic emission sensor in accordance with the teachings of this disclosure.

FIG. 2 is a schematic illustration of the example acoustic emission demodulator apparatus of FIG. 1 integrated into another example acoustic emission sensor that includes another example acoustic emission pre-amplifier in accordance with the teachings of this disclosure.

FIG. 3 is a schematic illustration of the example acoustic emission demodulator apparatus of FIGS. 1-2 integrated into yet another example acoustic emission pre-amplifier in accordance with the teachings of this disclosure.

FIG. 4 is a block diagram of an example implementation of the example acoustic emission demodulator apparatus of FIGS. 1-3, and the example acoustic emission sensor and the example acoustic emission pre-amplifier of FIG. 1.

FIG. 5 is a block diagram of an example implementation of the example acoustic emission demodulator apparatus of FIGS. 1-3, and the example acoustic emission sensor and the example acoustic emission pre-amplifier of FIG. 2.

FIG. 6 is a block diagram of an example implementation of the example acoustic emission demodulator apparatus of FIGS. 1-3, and the example acoustic emission sensor and the example acoustic emission pre-amplifier of FIG. 3.

FIGS. 7-9 are flowcharts representative of example methods that may be performed using the example acoustic emission demodulator apparatus and/or the example acoustic emission sensor and/or the example acoustic emission pre-amplifier of FIGS. 1-6 to generate an acoustic emission spectrum using chirp demodulation.

FIG. 10A is an example graph depicting an example acoustic emission signal.

FIG. 10B is an example graph depicting an example mixed acoustic emission signal.

FIG. 10C is an example graph depicting an example filtered mixed acoustic emission signal.

FIG. 10D is an example graph depicting example demodulated acoustic emission data.

FIG. 11 is a block diagram of an example processor platform structured to execute machine readable instructions to implement the methods of FIGS. 7-9 and/or the example acoustic emission demodulator apparatus of FIGS. 1-6, and/or the acoustic emission sensor and/or the acoustic emission pre-amplifier of FIGS. 1 and 4.

FIG. 12 is a block diagram of another example processor platform structured to execute machine readable instructions to implement the methods of FIGS. 7-9 and/or the example acoustic emission demodulator apparatus of FIGS. 1-6, and/or the acoustic emission sensor and/or the acoustic emission pre-amplifier of FIGS. 2 and 5.

FIG. 13 is a block diagram of yet another example processor platform structured to execute machine readable instructions to implement the methods of FIGS. 7-9 and/or the example acoustic emission demodulator apparatus of FIGS. 1-6 and/or the acoustic emission pre-amplifier of FIGS. 3 and 6.

The figures are not to scale. Wherever possible, the same reference numbers will be used throughout the drawing(s) and accompanying written description to refer to the same or like parts. As used herein, the terms "coupled" and "operatively coupled" are defined as connected directly or indirectly (e.g., through one or more intervening structures and/or layers).

METHODS AND APPARATUS TO GENERATE AN ACOUSTIC EMISSION SPECTRUM USING CHIRP DEMODULATION

FIELD OF THE DISCLOSURE

This disclosure relates generally to acoustic emission apparatus and methods, and, more particularly, to methods and apparatus to generate an acoustic emission spectrum using chirp demodulation.

BACKGROUND

Acoustic emission sensors generate acoustic emission signals (e.g., an electrical voltage signal) in response to acoustic emissions (e.g., transient elastic waves) sensed, measured, and/or detected via a sensing element (e.g., one or more piezoelectric crystals) of the acoustic emission sensor. Sources of acoustic emissions may include the formation and/or propagation of a material defect (e.g., a crack), slip and/or dislocation movements of a material, etc.

Conventional acoustic emission measurement and detection environments include an acoustic emission sensor, a preamplifier, a filter, an amplifier, an analog to digital converter, and a data processing device (e.g., a computer). In such conventional environments, the acoustic emission signals are typically conditioned and/or modified via the preamplifier, the filter, the amplifier, and the analog to digital converter, and then subsequently analyzed at the data processing device to detect and/or characterize acoustic emission events (e.g., formation and/or propagation of a material defect, determination of a leakage rate, etc.) associated with the acoustic emission signals.

SUMMARY

Methods and apparatus to generate an acoustic emission spectrum using chirp demodulation are disclosed herein. In some disclosed examples, an apparatus includes a pre-amplifier to condition an acoustic emission signal based on an acoustic emission source, a demodulator to generate demodulated acoustic emission data based on combining the acoustic emission signal with a chirp signal, and a transmitter to transmit the demodulated acoustic emission data to a data acquisition system.

In some disclosed examples, a method includes conditioning an acoustic emission signal based on an acoustic emission source with a pre-amplifier integrated into an acoustic emission sensor, generating a chirp signal, combining the acoustic emission signal with the chirp signal, generating demodulated acoustic emission data based on the combined signal, and transmitting the demodulated acoustic emission data to a data acquisition system.

In some disclosed examples, a non-transitory computer readable storage medium comprising instructions is disclosed. In some disclosed examples, the instructions, when executed, cause a machine to at least condition an acoustic emission signal based on an acoustic emission source with a pre-amplifier integrated into an acoustic emission sensor, generate a chirp signal, combine the acoustic emission signal with the chirp signal, generate demodulated acoustic emission data based on the combined signal, and transmit the demodulated acoustic emission data to a data acquisition system.

DETAILED DESCRIPTION

Figure 1:
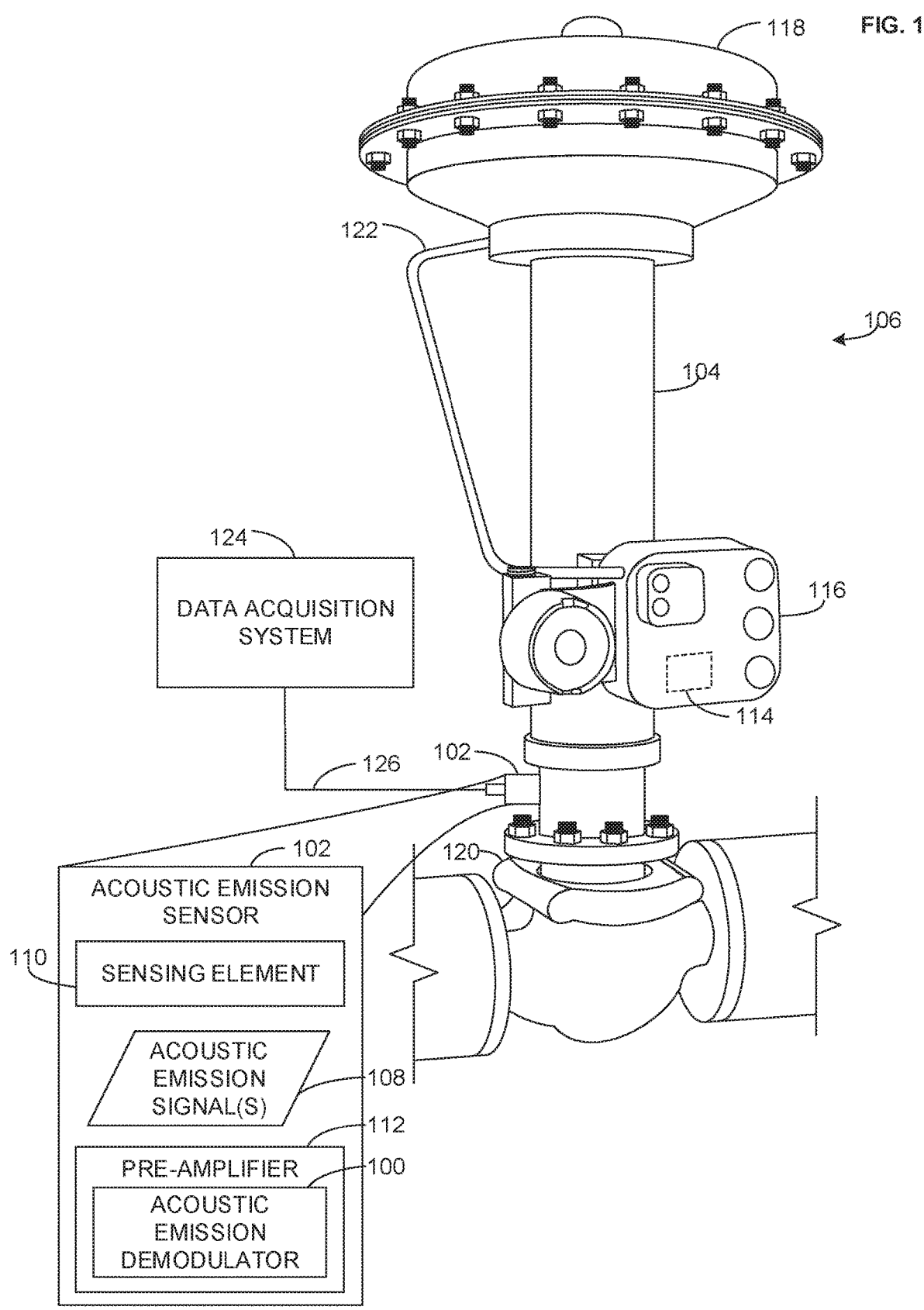
FIG. 1 is a schematic illustration of an example acoustic emission demodulator apparatus integrated into an example

Conventional acoustic emission measurement and detection environments include an acoustic emission sensor, a preamplifier, a filter, an amplifier, an analog to digital converter, and a data processing device (e.g., a computer). In such conventional environments, the acoustic emission signals are typically conditioned and/or modified via the preamplifier, the filter, the amplifier, and the analog to digital converter, and then subsequently analyzed at the data processing device to detect and/or characterize acoustic emission events (e.g., formation and/or propagation of a material defect, determination of a leakage rate, etc.) associated with the acoustic emission signals.

In some known acoustic emission measurement and detection environments, signal conditioning circuitry including the preamplifier, the filter, and the amplifier is included within a data acquisition device that also includes the analog to digital converter. In other known acoustic emission measurement and detection environments, the preamplifier and the filter of the signal conditioning circuitry are integrated within the acoustic emission sensor, rather than being integrated within the data acquisition device. In still other known acoustic emission measurement and detection environments, the preamplifier and the filter of the signal conditioning circuitry are integrated within an external preamplifier device operatively located and/or positioned between the acoustic emission sensor and the data acquisition device, rather than being integrated within the data acquisition device.

The above-described conventional acoustic emission measurement and detection environments require high speed sampling (e.g., via the data acquisition device) and extensive post-processing (e.g., via the data processing device) to produce useful information regarding the integrity and/or health of the material(s) (e.g., process equipment) being monitored and/or evaluated. Examples of such useful information may include determinations and/or estimations of leakage rate, flow rate, flow capacity, flow area, flow velocity, mass accumulation, and/or volume accumulation associated with a process occurring within process equipment being monitored by the acoustic emission sensor, and may further include determinations and/or estimations of valve health, valve wear, seal health, seal wear, and/or fugitive emissions associated with the monitored process equipment.

The above-described conventional acoustic emission measurement and detection environments fail to produce process information (e.g., leakage rate data, flow rate data, valve health data, valve wear data, etc.) in real time without the use of external data acquisition devices and/or computationally intensive post-processing systems. Moreover, the aforementioned high-speed sampling and extensive post-processing requirements of such conventional acoustic emission measurement and detections systems necessitate the implementation of high-end data acquisition and data processing equipment, which increases the complexity and the cost of the acoustic emission measurement and detection system. The implementation of such high-end equipment becomes technologically challenging in low power and/or hazardous environments.

Unlike the above-described conventional acoustic emission measurement and detection environments, the example acoustic emission demodulator apparatus and methods disclosed herein provide demodulation, filtering, and conversion of acoustic emission signals into values representing an amplitude or an energy present within a desired bandwidth. By using demodulation techniques, such as chirp demodulation, in a signal conditioning chain of acoustic emission signals, a frequency content of a continuous acoustic emission source can be resolved without a need to digitally sample at high rates.

Chirp demodulation methods include generating chirp signals (e.g., chirps), sweep signals, time-varying electrical signals, etc. In some examples, a chirp signal is generated by a chirp function that sweeps a specified frequency interval in a certain time interval. For example, a chirp signal may include an electrical signal which increases (e.g., an upchirp) or decreases (e.g., a down-chirp) in frequency with respect to time. For example, the frequency of the electrical signal may increase or decrease linearly, exponentially, logarithmically, quadratically, etc., with respect to time. For example, in a linear chip, the instantaneous frequency f(t) varies exactly linearly with time as described below in Equation (1):

$$f(t)=f_0+kt \quad \text{Equation (1)}$$

In the illustrated example of Equation (1) above, t represents a point in time, $f_0$ represents the start frequency (e.g., at time t=0), and k represents the rate of frequency change, where k is described below in Equation (2):

$$k = \frac{f_1 - f_0}{T} \quad \text{Equation (2)}$$

In the illustrated example of Equation (2) above, $f_1$ represents the end frequency and $f_0$ represents the start frequency. In the illustrated example of Equation (2) above, T represents a sweep time or an amount of time to sweep from $f_0$ to $f_1$.

In some examples, the chip signal (e.g., the sweeping electrical signal, the time-varying electrical signal, etc.) varies between a low point and a high point in a chirp bandwidth (e.g., an acoustic emission signal bandwidth, a frequency bandwidth, a measurement bandwidth, etc.). For example, the low point may be at or below the lowest frequency of interest in the acoustic emission signal bandwidth. The high point may be at or above the highest frequency of interest in the acoustic emission signal bandwidth. For example, the chirp signal may sweep (e.g., iteratively sweep) from the low point to the high point in the acoustic emission signal bandwidth within T as described above in connection with Equation (2). In some examples, the chirp signal is compared to and/or combined or mixed with an electrical signal of interest (e.g., an amplified acoustic emission signal of interest) to generate demodulated data. For example, the demodulated data may include time-varying data corresponding to frequency information (e.g., an amplitude, an energy, a frequency, etc.) of the electrical signal of interest varying with respect to time (e.g., average signal level data, root mean square data, time-averaged data, etc.).

Example acoustic emission demodulator (AED) apparatus disclosed herein use a chirp generator to generate chirp signals based on a bandwidth (e.g., a frequency bandwidth) of interest. In some disclosed examples, the chirp generator includes analog circuitry such as a voltage-controlled oscillator, a Yttrium iron garnet (YIG) oscillator, etc., to generate chirp signals. In some disclosed examples, the chirp generator includes digital circuitry such as a digital signal processor and a digital to analog converter using a direct digital synthesizer to generate chirp signals. In some disclosed examples, the chirp generator generates the chirp signals to sweep (e.g., iteratively sweep) between a low point and a high point of the bandwidth of interest. For example, the chirp generator may generate a chirp signal that iteratively sweeps from 15 kilohertz (kHz) to 1.1 megahertz (MHz) within 1 second based on a bandwidth of interest of 20 kHz to 1.0 MHz. Alternatively, any other sweep range, time period, and/or bandwidth of interest may be used.

In some disclosed examples, the AED apparatus combines the chirp signal with a transient signal such as an acoustic emission signal to generate mixed acoustic emission data. For example, the AED apparatus may combine the chirp signal with the acoustic emission signal by multiplying the signals together and evaluating the resulting signal based on a fractional set of frequency points (e.g., evaluating a subset of the resulting spectrum). When combining the chirp signal with the acoustic emission signal, the amplitude or the intensity of the mixed acoustic emission signal varies in line with the acoustic emission signal. In some disclosed examples, the AED apparatus generates demodulated acoustic emission data by extracting demodulated signal data to characterize or represent an acoustic emission source for a measurement time period. For example, the demodulated signal data may include time-averaged data such as average signal level (ASL) data, root mean square data, etc. In another example, the demodulated signal data may include spectral data (e.g., acoustic emission spectral data such as an amplitude, an energy, a frequency, etc., and/or a combination thereof varying with respect to the chirp signal). For example, the AED apparatus may extract an amplitude from the mixed acoustic emission data, map the extracted amplitude to a corresponding time value, and map the time value to a corresponding frequency. In such an example, the extracted signal data may include a mixture of time and frequency information.

In some disclosed examples, the AED apparatus directs the acoustic emission sensor, the pre-amplifier, etc., to display information (e.g., the time-averaged data, the spectral data, etc.) on a presentation device on the acoustic emission sensor, the pre-amplifier, etc. In some disclosed examples, the AED apparatus transmits the information to an external data acquisition system via an analog communication protocol or a digital communication protocol. In such disclosed examples, the AED apparatus transmits the information at a substantially lower rate compared to a rate necessary to record the transient signal while requiring less data points to adequately represent the spectrum of the transient signal.

FIG. 1 is a schematic illustration of an example acoustic emission demodulator (AED) 100 integrated into an example acoustic emission sensor 102 in accordance with the teachings of this disclosure. In the illustrated example, the acoustic emission sensor 102 is coupled to a fluid flow control assembly 104 operating in a process control environment 106. The acoustic emission sensor 102 of the illustrated example is a transducer that generates acoustic emission signals 108 (e.g., an electrical voltage signal) in response to acoustic emissions (e.g., transient elastic waves) sensed, measured, and/or detected via a sensing element 110 (e.g., one or more piezoelectric crystals) of the acoustic emission sensor 102. For example, the acoustic emission signals 108 may be electrical voltage signals generated by the sensing element 110 which represent an acoustic emission spectrum of one or more acoustic emission sources. In such an example, the acoustic emission sensor 102 may process the acoustic emission signals 108 to generate data (e.g., the time-averaged signal of one or more bandwidths and/or a complete spectrum of the acoustic emission signals 108 over a sample period).

In the illustrated example, the acoustic emission sensor 102 includes a pre-amplifier 112, which includes the AED 100. The pre-amplifier 112 of the illustrated example conditions the acoustic emission signal 108 by amplifying, boosting, strengthening, and/or filtering the acoustic emission signal 108 to generate pre-amplified acoustic emission data. In some examples, the pre-amplifier 112 amplifies, boosts, and/or strengthens the acoustic emission signal 108 prior to filtering the acoustic emission signal 108. In other examples, the pre-amplifier 112 amplifies, boosts, and/or strengthens the acoustic emission signal 108 after filtering the acoustic emission signal 108. For example, the pre-amplifier 112 may filter the acoustic emission signal 108 via one or more filters such as a band-pass filter, a low-pass filter, a high-pass filter, etc., and/or a combination thereof. In another example, the pre-amplifier 112 may inherently filter the acoustic emission signal 108 via interacting with the voltage signal produced by the sensing element 110 due to an impedance characteristic of one or more amplifiers (e.g., an operational amplifier, a differential amplifier, etc.) included in the pre-amplifier 112. In another example, the pre-amplifier 112 may amplify, boost, and/or strengthen the acoustic emission signal 108 using a configurable gain based on one or more components such as a differential amplifier, an operational amplifier, etc., and/or a combination thereof. As used herein, the terms "pre-amplified acoustic emission data" and "pre-amplified acoustic emission signal" are used interchangeably and refer to the acoustic emission signal 108 that has been amplified and/or filtered by the pre-amplifier 112.

In the illustrated example, the AED 100 includes a chirp generator to generate a chirp signal (e.g., a time-varying electrical signal) at an increasing or decreasing frequency. In the illustrated example, the AED 100 combines the chirp signal with the acoustic emission signal 108 to generate mixed acoustic emission data. As used herein, the terms "mixed acoustic emission data" and "mixed acoustic emission signal" are used interchangeably and refer to the pre-amplified acoustic emission data that has been processed by the AED 100. For example, mixed acoustic emission data may include an electrical signal resulting from combining the acoustic emission signal 108 with an electrical signal generated by the chirp generator.

In some examples, the AED 100 generates acoustic emission data to characterize or represent an acoustic emission source during a measurement time period and within an AE signal bandwidth selection of the chirp generator (e.g., a chirp generator bandwidth). For example, the bandwidth selection may correspond to an AE signal bandwidth of 20 kHz to 40 kHz. In another example, the bandwidth selection may correspond to a data extractor bandwidth of 45 kHz to 65 kHz. As used herein, the terms "demodulated acoustic emission data," "demodulated acoustic emission signal data," and "demodulated signal data" are used interchangeably and refer to the data or information extracted from and/or processed based on the mixed acoustic emission data. For example, the demodulated acoustic emission data may include spectral information (e.g., an amplitude, an energy, frequency information, etc., and/or a combination thereof). In another example, the demodulated acoustic emission data may include time-averaged information (e.g., ASL data, RMS data, etc.), etc. As used herein, the term "frequency information" refers to processed data such as an amplitude value, a frequency value, etc., extracted from the mixed acoustic emission data by using one or more configurations, settings, etc., of the one or more filters and/or the one or more oscillators included in the AED 100 of FIG. 1.

In some examples, the demodulated acoustic emission data includes a combination of spectral information and time-averaged information. For example, the demodulated acoustic emission data may include information from the time domain and/or the frequency domain. For example, the AED 100 may extract spectral information, time-averaged information, etc., and/or a combination thereof from the mixed acoustic emission data every 10 milliseconds, 100 milliseconds, etc. In such an example, the demodulated acoustic emission data represents data and information corresponding to the acoustic emission signal 108 based on an acoustic emission source (e.g., a continuous acoustic emission source) of the fluid flow control assembly 104. For example, the demodulated acoustic emission data may include a spectrum representative of the acoustic emission source.

In the illustrated example, the AED 100 generates demodulated acoustic emission data to detect the formation and/or propagation of one or more defect(s) (e.g., a crack in a valve 120) and/or one or more event(s) associated with the defect(s) (e.g., a leakage rate associated with the formation and/or propagation of the defect) in the fluid flow control assembly 104 of FIG. 1. The fluid flow control assembly 104 of the illustrated example is a pneumatically actuated valve assembly. In the illustrated example, the fluid flow control assembly 104 is controlled by a field device 114 such as an electronic valve controller housed in an enclosure 116. The enclosure 116 is coupled to the fluid flow control assembly 104, which includes at least an actuator 118 and the valve 120 (e.g., a butterfly valve, a globe valve, etc.). The actuator 118 of the illustrated example is activated via changes in pneumatic pressure from a pneumatic tube connection 122. However, other valve assemblies may additionally or alternatively be used, such as an electrically actuated valve assembly, a hydraulically actuated valve assembly, etc.

In the illustrated example, the acoustic emission sensor 102 is communicatively coupled to an example external data acquisition system 124. The example acoustic emission sensor 102 of the illustrated example is communicatively coupled to the data acquisition system 124 via a cable 126 that includes one or more wires. Additionally or alternatively, the example acoustic emission sensor 102 may be connected to the example data acquisition system 124 via a wireless connection. For example, the acoustic emission sensor 102 may communicate with the data acquisition system 124 via a Bluetooth® connection, a Wi-Fi Direct® network, etc.

In some examples, the data acquisition system 124 is a process control system or a part of a process control system (e.g., the data acquisition system 124 is communicatively coupled to a process control system) that includes a controller for data acquisition and/or process control. In the illustrated example, the acoustic emission sensor 102 transmits information (e.g., the acoustic emission signal 108, the demodulated acoustic emission data, etc.) to the data acquisition system 124. For example, the acoustic emission sensor 102 may transmit spectral information, time-averaged information, etc., and/or a combination thereof based on the acoustic emission signal 108 to the data acquisition system 124. In the illustrated example, the data acquisition system 124 transmits information to the acoustic emission sensor 102. For example, the data acquisition system 124 may transmit configuration selection data such as a sweep time for a chirp generator included in the AED 100, a gain of the pre-amplifier 112, etc.

Figure 2:
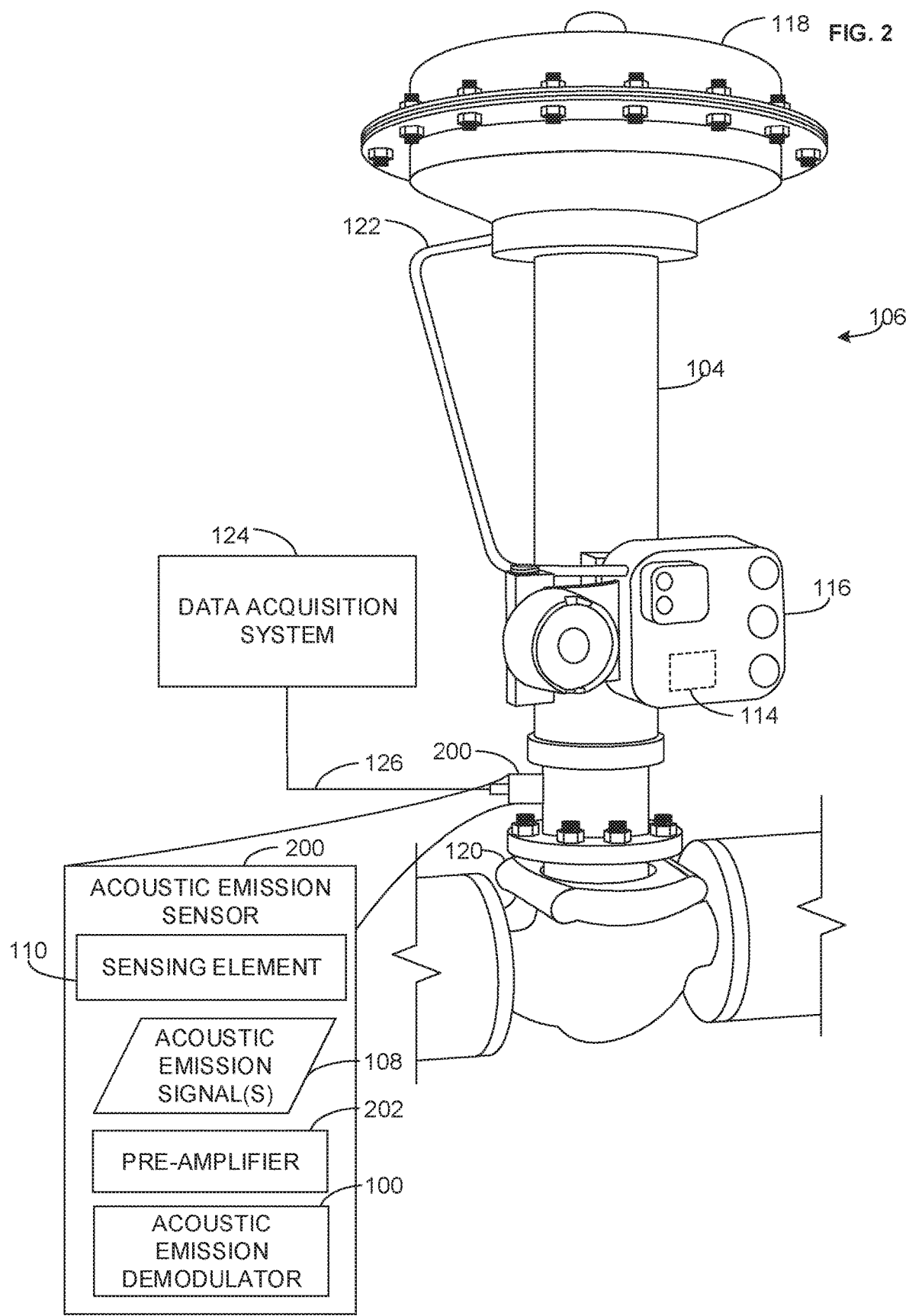

FIG. 2 is a schematic illustration of the example AED 100 of FIG. 1 integrated into another example acoustic emission sensor 200 that includes another example acoustic emission pre-amplifier 202 in accordance with the teachings of this disclosure. The acoustic emission sensor 200 of the illustrated example is a transducer that generates the acoustic emission signals 108 of FIG. 1 based on the sensing element 110 of FIG. 1 as described above in connection with the acoustic emission sensor 102 of FIG. 1. In the illustrated example, the pre-amplifier 202 conditions the acoustic emission signal 108 of FIG. 1 by amplifying, boosting, strengthening, and/or filtering the acoustic emission signal 108 as described above in connection with the pre-amplifier 112 of FIG. 1. In some examples, the pre-amplifier 202 amplifies, boosts, and/or strengthens the acoustic emission signal 108 prior to filtering the acoustic emission signal 108. In other examples, the pre-amplifier 202 amplifies, boosts, and/or strengthens the acoustic emission signal 108 after filtering the acoustic emission signal 108. For example, the pre-amplifier 202 may filter the acoustic emission signal 108 and/or use a configurable gain as described above in connection with the pre-amplifier 112 of FIG. 1.

In the illustrated example, the AED 100 obtains pre-amplified acoustic emission data from the pre-amplifier 202. For example, the AED 100 may use a chirp generator to generate a chirp signal. In such an example, the AED 100 may combine the chirp signal with the pre-amplified acoustic emission data to generate mixed acoustic emission data. In the illustrated example, the AED 100 extracts demodulated acoustic emission data from the mixed acoustic emission data representative of an acoustic emission source during a measurement time period and within an AE signal bandwidth selection of the chirp generator, and transmits the demodulated acoustic emission data to the data acquisition system 124 of FIG. 1.

In the illustrated example, the pre-amplifier 202 is separate from the AED 100. For example, the AED 100 and the pre-amplifier 202 may be separate hardware, software, firmware and/or any combination of hardware, software and/or firmware. In such an example, the AED 100 may be implemented by first hardware that includes one or more analog or digital circuit(s), logic circuits, programmable processor(s), application specific integrated circuit(s) (ASIC(s)), programmable logic device(s) (PLD(s)) and/or field programmable logic device(s) (FPLD(s)) while the pre-amplifier 202 may be implemented by second hardware that includes one or more analog or digital circuit(s), logic circuits, programmable processor(s), application specific integrated circuit(s) (ASIC(s)), programmable logic device(s) (PLD(s)) and/or field programmable logic device(s) (FPLD(s)). In another or in the same example, the AED 100 and the pre-amplifier 202 may be executed by separate software components such as different software algorithms, computer readable instructions, software applications, software modules, or software programs, etc.

Figure 3:
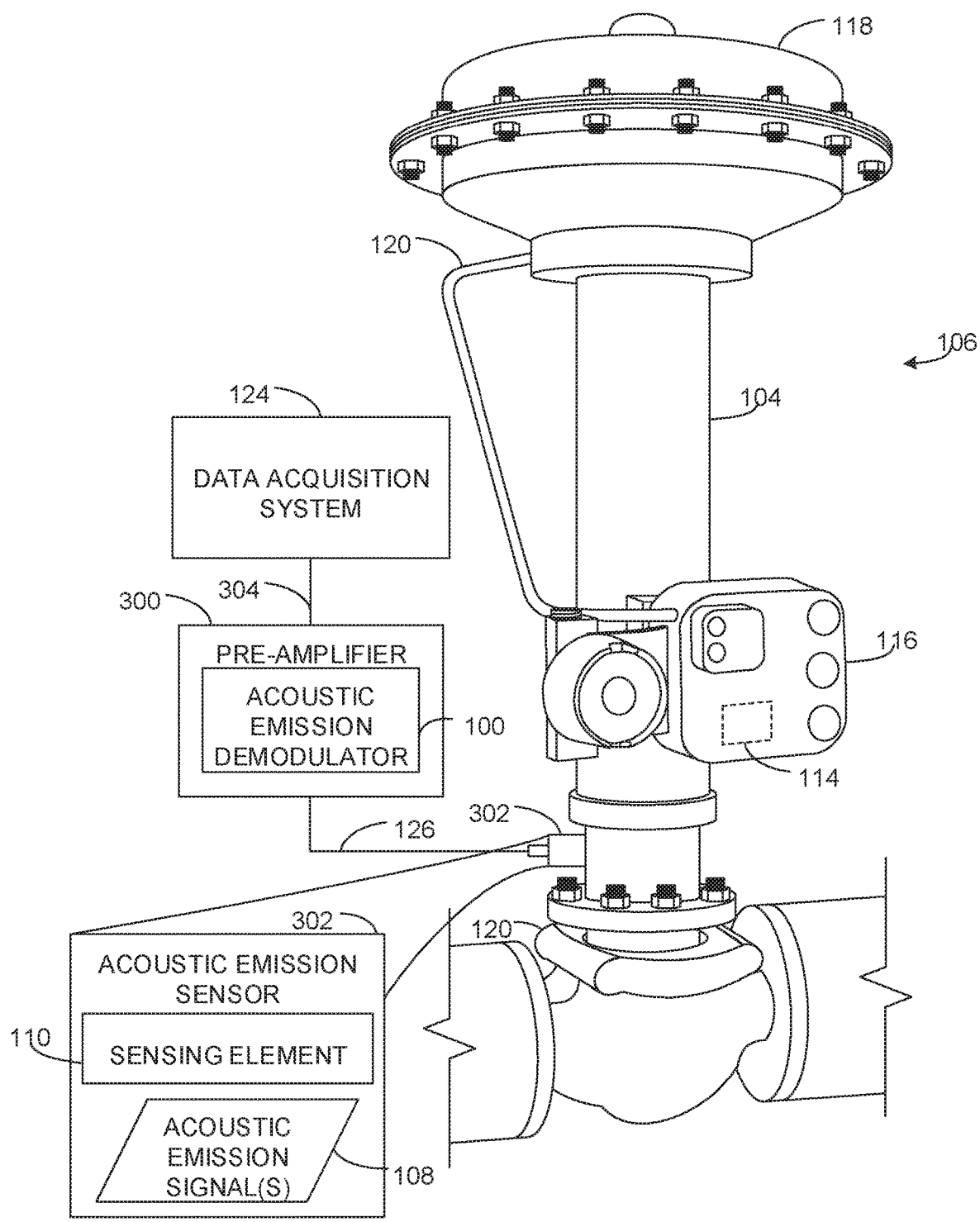

FIG. 3 is a schematic illustration of the example AED 100 of FIGS. 1-2 integrated into yet another example acoustic emission pre-amplifier 300, which is external to or separate from yet another example acoustic emission sensor 302 in accordance with the teachings of this disclosure. In the illustrated example, the pre-amplifier 300 is communicatively coupled to the acoustic emission sensor 302. The acoustic emission sensor 302 of the illustrated example is a transducer that generates the acoustic emission signals 108 of FIGS. 1-2 based on the sensing element 110 of FIGS. 1-2 as described above in connection with the acoustic emission sensor 102 of FIG. 1 and/or the acoustic emission sensor 200 of FIG. 2.

In the illustrated example, the pre-amplifier 300 conditions the acoustic emission signal 108 of FIGS. 1-2 by amplifying, boosting, strengthening, and/or filtering the acoustic emission signal 108 as described above in connection with the pre-amplifier 112 of FIG. 1 and/or the preamplifier 202 of FIG. 2. In some examples, the pre-amplifier 300 amplifies, boosts, and/or strengthens the acoustic emission signal 108 prior to filtering the acoustic emission signal 108. In other examples, the pre-amplifier 300 amplifies, boosts, and/or strengthens the acoustic emission signal 108 after filtering the acoustic emission signal 108. For example, the pre-amplifier 300 may filter the acoustic emission signal 108 and/or use a configurable gain as described above in connection with the pre-amplifier 112 of FIG. 1 and/or the pre-amplifier 202 of FIG. 2.

In the illustrated example of FIG. 3, the AED 100 obtains pre-amplified acoustic emission data from the pre-amplifier 300 based on the acoustic emission signal 108. For example, the AED 100 may use a chirp generator to generate a chirp signal. In such an example, the AED 100 may combine the chirp signal with the pre-amplified acoustic emission data based on the acoustic emission signal 108 to generate mixed acoustic emission data. In the illustrated example, the AED 100 extracts demodulated acoustic emission data from the mixed acoustic emission data representative of an acoustic emission source during a measurement time period and within an AE signal bandwidth selection of the chirp generator, and transmits the demodulated acoustic emission data to the data acquisition system 124 of FIGS. 1-2 via a cable 304 that includes one or more wires. The example pre-amplifier 300 may additionally or alternatively be connected to the data acquisition system 124 via a wireless connection. For example, the pre-amplifier 300 of FIG. 3 may communicate with the data acquisition system 124 via a Bluetooth® connection, a Wi-Fi Direct® network, etc.

Figure 4:
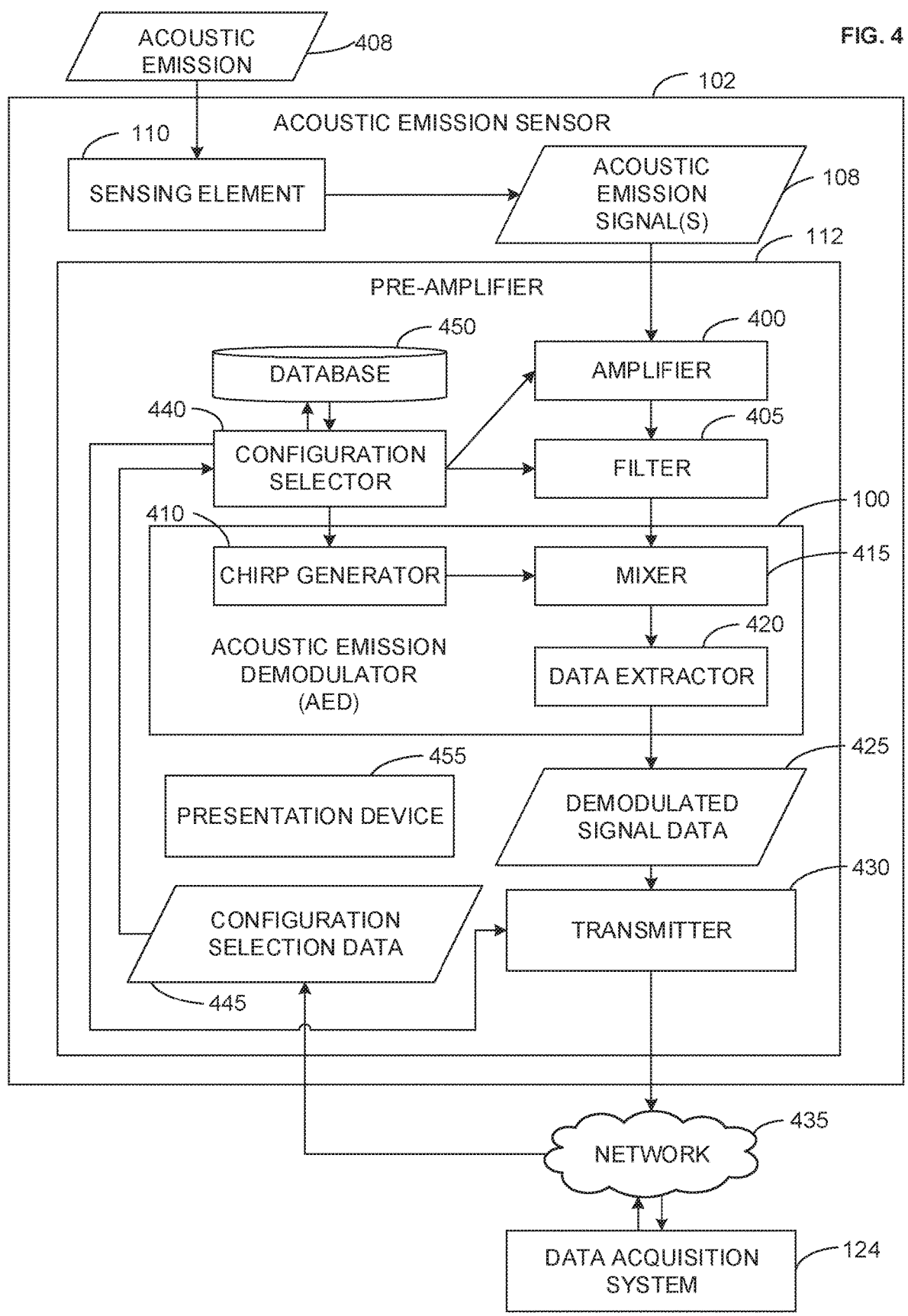

FIG. 4 is a block diagram of an example implementation of the example AED 100 of FIGS. 1-3, and the example acoustic emission sensor 102 and the example acoustic emission pre-amplifier 112 of FIG. 1 in accordance with the teachings of this disclosure. In the illustrated example, the acoustic emission sensor 102 includes the pre-amplifier 112 to amplify, boost, strengthen, and/or filter the acoustic emission signal 108 of FIGS. 1-3. In the illustrated example, the pre-amplifier 112 includes an example amplifier 400 (e.g., an input amplifier) and an example filter 405. In the illustrated example, the acoustic emission signal 108 is based on the sensing element 110 of FIGS. 1-3 sensing, measuring, and/or detecting an acoustic emission 408. For example, the acoustic emission 408 may be a formation and/or a propagation of a material defect associated with the fluid flow control assembly 104 of FIGS. 1-3.

In the illustrated example of FIG. 4, the pre-amplifier 112 includes the input amplifier 400 to increase a characteristic, a parameter, etc., of the acoustic emission signal 108 such as a power, a voltage, etc. For example, the input amplifier 400 may be an impedance converter such as a negative impedance converter, a positive impedance converter, etc. In some examples, the input amplifier 400 includes one or more amplifiers such as a differential amplifier, an operational amplifier, etc., and/or a combination thereof. For example, the input amplifier 400 may increase a voltage of the acoustic emission signal 108 from a first voltage to a second voltage based on a gain value, where the gain value is based on an electrical circuit included in the input amplifier 400. In such an example, the electrical circuit may include an operational amplifier in circuit with one or more passive electrical components such as a capacitor, a resistor, etc., and/or a combination thereof. In some examples, the gain value is variable. In other examples, the gain value is fixed.

In the illustrated example, the input amplifier 400 amplifies, boosts, and/or strengthens an acoustic emission signal 108 to an acceptable level to be processed by one or more other components in the acoustic emission sensor 102 such as the AED 100. For example, the AED 100 may require an input voltage level of 1 volt for the acoustic emission signal 108. In such an example, the input amplifier 400 may increase a voltage of the acoustic emission signal 108 from 100 millivolts to 1 volt based on a gain of 20 decibels (e.g., 20 decibels=20×log(1 volt÷100 millivolts)).

In the illustrated example of FIG. 4, the pre-amplifier 112 includes the filter 405 to remove acoustic emission frequency information from the acoustic emission signal 108 obtained from the input amplifier 400. In some examples, the filter 405 includes one or more filters such as a band-pass filter, a low-pass filter, a high-pass filter, etc., and/or a combination thereof. The filter 405 of the illustrated example may be implemented as any type of filter including, for example, active, passive, superheterodyne, envelope detection, capacitor switching, field programmable gate array, finite impulse response, infinite impulse response, etc. For example, the filter 405 may include a band-pass filter to remove acoustic emission frequency information outside of a frequency range of 20 kHz to 40 kHz. Alternatively, the filter 405 may be incorporated into the input amplifier 400. For example, the input amplifier 400 and the filter 405 may output pre-amplified acoustic emission data.

In the illustrated example of FIG. 4, the acoustic emission sensor 102 includes the AED 100 to generate acoustic emission spectral data based on pre-amplified acoustic emission data. Alternatively, the example AED 100 may process the example acoustic emission signal 108 prior to the example input amplifier 400 and/or the example filter 405 conditioning the acoustic emission signal 108. In the illustrated example, the AED 100 includes a chirp generator 410 to create chirp signals that include electrical signals which vary with respect to time by increasing or decreasing in frequency.

In some examples, the chirp generator 410 includes one or more oscillators to generate the chirp signals within a specified frequency range based on information from the configuration selector 440. For example, the chirp generator 410 may generate the chirp signals based on a frequency range (e.g., a frequency range based on a start frequency value, an end frequency value, etc.) and/or a sweep time of interest. In such an example, the chirp generator 410 may obtain the frequency range and/or the sweep time of interest from the configuration selector 440. For example, the chirp generator 410 may obtain a start frequency value of 25 kHz, an end frequency value of 1.1 MHz, and a sweep time of 100 milliseconds from the configuration selector 440. In some examples, the chirp generator 410 determines whether to generate chirp signals using another frequency range and/or another sweep time of interest. For example, the chirp generator 410 may obtain a start frequency value of 50 kHz, an end frequency value of 450 kHz, and a sweep time of 150 milliseconds from the configuration selector 440.

In some examples, the chirp generator 410 generates chirp signals using one or more oscillators. For example, the chirp generator 410 may include one or more voltage-controlled oscillators, Yttrium iron garnet (YIG) oscillators, etc., and/or a combination thereof to generate chirp signals. Additionally or alternatively, the example chirp generator 410 may generate chirp signals using one or more digital circuits that include one or more digital signal processors, one or more digital to analog converters, and/or one or more direct digital synthesizers, etc., and/or a combination thereof.

In the illustrated example of FIG. 4, the AED 100 includes a mixer 415 to combine a chirp signal with the pre-amplified acoustic emission signal to generate a mixed acoustic emission signal. In the illustrated example, the mixer 415 combines the output (e.g., the electrical output, the software output, etc.) of the filter 405 with the output of the chirp generator 410 to produce a frequency-shifted version of the pre-amplified acoustic emission signal overlapping an intermediate frequency band. For example, the mixer 415 may shift one or more frequencies of the pre-amplified acoustic emission signal towards an intermediate frequency which may be a lower or a higher frequency than that of the frequency of the pre-amplified acoustic emission signal.

For example, the mixer 415 may shift a first measurement center frequency in a measurement bandwidth of 50-450 kHz to an intermediate frequency such as an intermediate center frequency of 10 MHz and an intermediate frequency bandwidth of 50 kHz. In another example, the mixer 415 may multiply the output of the filter 405 with the output of the chirp generator 410 to generate information in the frequency domain, the time-domain, etc., and/or a combination thereof. Additionally or alternatively, the example mixer 415 may combine the outputs by any other mathematical operation, process, etc., including a convolution operation, a Fourier transform operation, etc.

In the illustrated example of FIG. 4, the AED 100 includes a data extractor 420 to generate example demodulated signal data 425 (e.g., a demodulated acoustic emission signal) from the mixed acoustic emission data (e.g., a mixed acoustic emission signal) based on the acoustic emission signal 108. In some examples, the data extractor 420 filters and/or selects frequencies of interest (e.g., a filter bandwidth, a frequency bandwidth, etc.) around the intermediate center frequency. For example, the data extractor 420 may filter (e.g., filter using a band-pass filter, a low-pass filter, etc., and/or a combination thereof) a mixed acoustic emission signal to remove frequency information that does not fall within a bandwidth of interest to generate a filtered mixed acoustic emission signal. For example, the data extractor 420 may use a band-pass filter to remove all but one of the sidebands (e.g., a lower sideband, an upper sideband, etc.) of the mixed acoustic emission signal to generate a single sideband acoustic emission signal. In another example, the data extractor 420 may use a low-pass filter and an envelope detector to extract low frequency information of interest to generate a double sideband acoustic emission signal, a full-band acoustic emission signal, etc.

In some examples, the data extractor 420 generates demodulated signal data 425 based on generating one or more single sideband acoustic emission signals. For example, the data extractor 420 may sample spectral information of a single sideband acoustic emission signal at a measurement center frequency based on an instantaneous frequency value of a chirp signal. The example data extractor 420 may generate a low-resolution and high-bandwidth spectrum by sampling one or more measurements of the filtered mixed acoustic emission data in sync with the chirp signal. For example, the data extractor 420 may (1) take a measurement every time a single sideband acoustic emission signal is generated based on the chirp signal increasing or decreasing in frequency, (2) build a spectrum based on the measurements, and (3) generate the demodulated signal data 425 based on the spectrum.

In some examples, the data extractor 420 includes an amplifier (e.g., a log amplifier) to convert an input voltage of the filtered mixed acoustic emission signal to an output voltage proportional to a logarithm (e.g., a natural logarithm, a base 10 logarithm, etc.) of the input voltage. In such examples, the data extractor 420 averages the output voltages over a time period to generate demodulated signal data.

In some examples, the demodulated signal data 425 includes root mean square (RMS) data associated with the filtered mixed acoustic emission signal. For example, the data extractor 420 may extract and/or calculate RMS data from the filtered mixed acoustic emission data by squaring the values of the filtered mixed acoustic emission data (e.g., squaring the function that defines the waveform of the mixed acoustic emission data), by taking the average of the squared values (e.g., the average of the squared function), and by taking the square root of the average values (e.g., the square root of the average function).

In some examples, the demodulated signal data 425 includes analog data and/or digital data. For example, the demodulated signal data 425 may be an analog signal such as an electrical voltage. In another example, the demodulated signal data 425 may be a digital signal corresponding to a binary value, a hexadecimal value, etc. In other examples, the demodulated signal data 425 includes ASL data associated with the filtered mixed acoustic emission data. For example, the data extractor 420 may extract and/or calculate ASL data from the filtered mixed acoustic emission data by taking the average signal values (e.g., the average of the function that defines the waveform of the filtered mixed acoustic emission data) as a function of time.

In some examples, the demodulated signal data 425 includes spectral information associated with the filtered mixed acoustic emission data. For example, the data extractor 420 may extract spectral content data associated with the filtered mixed acoustic emission data, and/or transient data associated with the filtered mixed acoustic emission data. The demodulated signal data 425 of FIG. 4 may include such spectral content data and/or transient data. In some examples, the data extractor 420 builds a spectrum based on the filtered mixed acoustic emission data, where the demodulated signal data 425 includes the spectrum. For example, the data extractor 420 may sweep the measurement bandwidth, select a sample (e.g., spectral information) within each bandwidth region, and build a low-resolution and high-bandwidth spectrum based on the samples. For example, the data extractor 420 may sample the spectral information included in the filtered mixed acoustic emission data in sync with the chirp signal generated by the chirp generator 410. For example, the data extractor 420 may sample the spectral information with every increase or decrease of the chirp signal.

In some examples, the data extractor 420 generates an alert when information included in the demodulated signal data 425 satisfies a threshold. For example, the data extractor 420 may compare a voltage amplitude included in the demodulated signal data 425 to a voltage amplitude threshold value (e.g., 0.1 Volts, 0.5 Volts, 1.2 Volts, etc.). In such an example, the data extractor 420 may generate an alert when the voltage amplitude is greater than the voltage amplitude threshold value (e.g., the voltage amplitude of 1.5 Volts is greater than the voltage amplitude threshold value of 1.2 Volts). Additionally or alternatively, the data extractor 420 may generate an alert when an energy value, a frequency value, etc., included in the demodulated signal data 425 satisfies an energy value threshold, a frequency value threshold, etc.

In the illustrated example of FIG. 4, the pre-amplifier 112 includes a transmitter 430 to transmit information (e.g., the acoustic emission signal 108, the demodulated signal data 425, an alert, etc.) to the data acquisition system 124 of FIGS. 1-3. Alternatively, the example transmitter 430 may be integrated into the example AED 100. The transmitter 430 of the illustrated example may be implemented by any type of interface standard, such as an Ethernet interface, a universal serial bus (USB), and/or a PCI express interface. The transmitter 430 of the illustrated example may further include a modem and/or a network interface card to facilitate exchange of data with the data acquisition system 124 via a network 435. In some examples, the network 435 over which the transmitter 430 exchange(s) data with the data acquisition system 124 may be facilitated via 4-20 milliamp wiring and/or via one or more communication protocol(s) including, for example, Highway Addressable Remote Transducer (HART), Foundation Fieldbus, Transmission Control Protocol/Internet Protocol (TCP/IP), Profinet, Modbus and/or Ethernet.

In the illustrated example of FIG. 4, the network 435 is a bus and/or a computer network. For example, the network 435 may be a process control network, a direct wired or a direct wireless connection to the data acquisition system 124, etc. In some examples, the network 435 is a network with the capability of being communicatively coupled to the Internet. However, the example network 435 may be implemented using any suitable wired and/or wireless network(s) including, for example, one or more data buses, one or more Local Area Networks (LANs), one or more wireless LANs, one or more cellular networks, one or more fiber optic networks, one or more satellite networks, one or more private networks, one or more public networks, etc. The example network 435 may enable the example acoustic emission sensor 102 to be in communication with the example data acquisition system 124. As used herein, the phrase "in communication," including variances thereof, encompasses direct communication and/or indirect communication through one or more intermediary components and does not require direct physical (e.g., wired) communication and/or constant communication, but rather includes selective communication at periodic or aperiodic intervals, as well as one-time events.

In the illustrated example of FIG. 4, the pre-amplifier 112 includes a configuration selector 440 to configure, modify, and/or select a configuration or a parameter (e.g., a configuration parameter) of one or more components in the acoustic emission sensor 102 based on example configuration selection data 445. For example, the configuration selector 440 may configure the input amplifier 400, the filter 405, the chirp generator 410, the transmitter 430, etc., based on obtaining the configuration selection data 445 from the data acquisition system 124 and/or a database 450. For example, the configuration selector 440 may obtain a start frequency value, a final or an end frequency value, a sweep time value, etc., from the data acquisition system 124 and configure the chirp generator 410 with the obtained information. For example, the configuration selector 440 may modify the start frequency value, the end frequency value, the sweep time value, etc., of the chirp generator 410. In some examples, the configuration selector 440 stores the configuration selection data 445 in the database 450. In some examples, the configuration selector 440 retrieves the configuration selection data 445 from the database 450.

In some examples, the configuration selector 440 obtains the configuration selection data 445 and compares information (e.g., acoustic emission sensor component parameter values, process control environment parameter values, etc.) included in the configuration selection data 445 to stored information in the database 450. For example, the configuration selector 440 may (1) obtain a first value for a sweep time from the data acquisition system 124, (2) compare the first value to a second value for the sweep time stored in the database 450, and (3) replace the second value with the first value when the configuration selector 440 determines they are different. In response to determining that the first and the second values are not different, the example configuration selector 440 discards the first value and keeps the second value stored in the database 450.

In the illustrated example of FIG. 4, the configuration selection data 445 includes parameter information, parameter values, etc., that can be used to configure one or more components of the AED 100, the pre-amplifier 112, and/or more generally, the acoustic emission sensor 102. In some examples, the configuration selection data 445 includes a gain parameter value, a direct current (DC) offset parameter value, etc., to configure or modify the input amplifier 400 of FIG. 4. In some examples, the configuration selection data 445 includes a type of one or more filters (e.g., a low-pass filter, a high-pass filter, a band-pass filter, a band-stop filter, etc.), a setting of the one or more filters (e.g., an input sensor signal range, a noise rejection level, etc.), etc., to configure the one or more filters included in the filter 405 of FIG. 4.

In some examples, the configuration selection data 445 of FIG. 4 includes a start frequency value, an end frequency value, a sweep time value, etc., to configure or modify the chirp generator 410 of FIG. 4. In some examples, the configuration selection data 445 includes process control environment data such as a valve size, a valve type, etc., of the fluid flow control assembly 104 of FIGS. 1-4. For example, the data extractor 420 may generate and/or process the demodulated signal data 425 to correspond to the process control environment data. In some examples, the configuration selection data 445 includes a parameter corresponding to a communication interface, a communication protocol, etc., to configure or modify the transmitter 430. For example, the configuration selection data 445 may include a communication parameter such as an Internet Protocol (IP) address and a port number to configure the transmitter 430 for Ethernet-based communication. In another example, the configuration selection data 445 may include a communication parameter such as an address, a manufacturer code, etc., to configure the transmitter 430 for HART communication.

In some examples, the configuration selection data 445 includes acoustic emission data analysis information such as alert threshold values, cycle times for obtaining the acoustic emission signal 108 and/or generating the demodulated signal data 425, etc. For example, the configuration selection data 445 may include a threshold value to be used by the data extractor 420 to generate an alert when information included in the demodulated signal data 425 satisfies a threshold. For example, the transmitter 430 may transmit an alert generated by the data extractor 420 when a voltage amplitude, a frequency, etc., included in the demodulated signal data 425 is greater than an amplitude threshold value, a frequency threshold value, etc.

In the illustrated example of FIG. 4, the pre-amplifier 112 includes the database 450 to record data (e.g., the configuration selection data 445). In some examples, the database 450 records the acoustic emission signal 108, the demodulated signal data 425, etc. The example database 450 may respond to queries for information related to data in the database 450. For example, the database 450 may respond to queries for additional data by providing the additional data (e.g., the one or more data points), by providing an index associated with the additional data in the database 450, etc. The example database 450 may additionally or alternatively respond to queries when there is no additional data in the database 450 by providing a null index, an end of database 450 identifier, etc.

The example database 450 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The example database 450 may additionally or alternatively be implemented by one or more double data rate (DDR) memories, such as DDR, DDR2, DDR3, DDR4, mobile DDR (mDDR), etc. The example database 450 may additionally or alternatively be implemented by one or more mass storage devices such as hard disk drive(s), compact disk drive(s) digital versatile disk drive(s), solid-state drive(s), etc. While in the illustrated example the database 450 is illustrated as a single database, the database 450 may be implemented by any number and/or type(s) of databases. Although the example database 450 is depicted in FIG. 4 as being included in the pre-amplifier 112, alternatively the database 450 may be separate from the pre-amplifier 112.

In the illustrated example, the acoustic emission sensor 102 includes a presentation device 455 to present data in visual and/or audible form at the acoustic emission sensor 102 of FIG. 4 including, for example, some or all of the demodulated signal data 425, some or all of the configuration selection data 445, a generated alert by the data extractor 420, etc. For example, the presentation device 455 may be implemented as one or more of a light emitting diode, a touchscreen, and/or a liquid crystal display for presenting visual information, and/or a speaker for presenting audible information. In some examples, the presentation of data via the presentation device 455 of the acoustic emission sensor 102 is controlled and/or managed by the data extractor 420.

While an example manner of implementing the example acoustic emission sensor 102, the example pre-amplifier 112, and/or the example AED 100 of FIG. 1 is illustrated in FIG. 4, one or more of the elements, processes and/or devices illustrated in FIG. 4 may be combined, divided, re-arranged, omitted, eliminated and/or implemented in any other way. Further, the example AED 100, the example pre-amplifier 112, the example input amplifier 400, the example filter 405, the example chirp generator 410, the example mixer 415, the example data extractor 420, the example transmitter 430, the example configuration selector 440, the example database 450, the example presentation device 455, and/or, more generally, the example acoustic emission sensor 102 of FIG. 4 may be implemented by hardware, software, firmware and/or any combination of hardware, software and/or firmware. Thus, for example, any of the example AED 100, the example pre-amplifier 112, the example input amplifier 400, the example filter 405, the example chirp generator 410, the example mixer 415, the example data extractor 420, the example transmitter 430, the example configuration selector 440, the example database 450, the example presentation device 455, and/or, more generally, the example acoustic emission sensor 102 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example AED 100, the example pre-amplifier 112, the example input amplifier 400, the example filter 405, the example chirp generator 410, the example mixer 415, the example data extractor 420, the example transmitter 430, the example configuration selector 440, the example database 450, and/or the example presentation device 455 is/are hereby expressly defined to include a non-transitory computer readable storage device or storage disk such as a memory, a digital versatile disk (DVD), a compact disk (CD), a Blu-ray disk, etc. including the software and/or firmware. Further still, the example acoustic emission sensor 102 of FIG. 1 may include one or more elements, processes and/or devices in addition to, or instead of, those illustrated in FIG. 4, and/or may include more than one of any or all of the illustrated elements, processes and devices.

Figure 5:
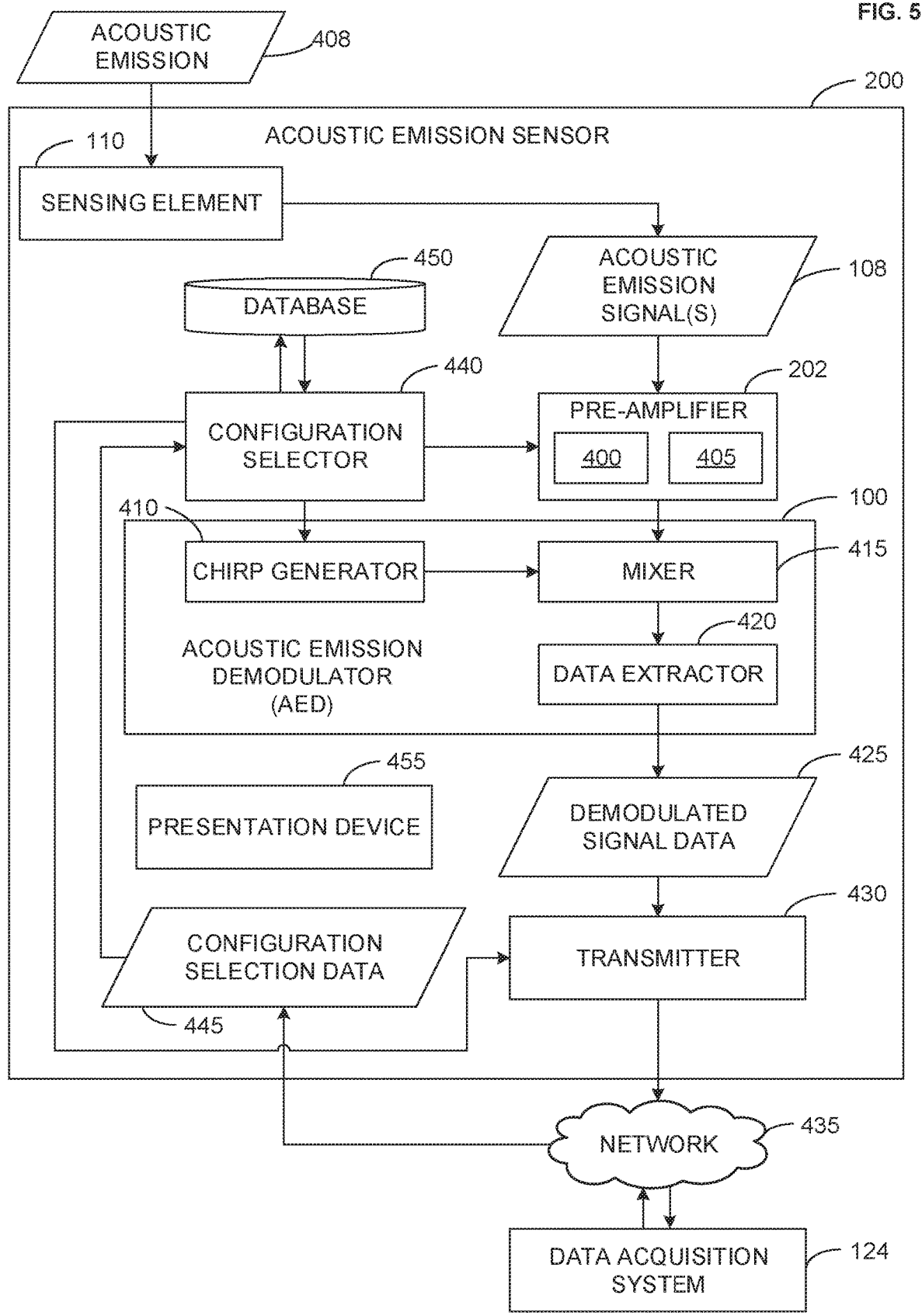

FIG. 5 is a block diagram of an example implementation of the example AED 100 of FIGS. 1-4, and the example acoustic emission sensor 200 and the example pre-amplifier 202 of FIG. 2 in accordance with the teachings of this disclosure. In the illustrated example, the acoustic emission sensor 200 includes the pre-amplifier 202 to amplify, boost, strengthen, and/or filter the acoustic emission signal 108 of FIGS. 1-4 based on the sensing element 110 of FIGS. 1-4 sensing, measuring, and/or detecting the acoustic emission 408 of FIG. 4. In the illustrated example, the pre-amplifier 202 includes the example input amplifier 400 and the example filter 405 to amplify, boost, strengthen, and/or filter the acoustic emission signal 108 as described above in connection with FIG. 4.

In the illustrated example of FIG. 5, the AED 100 is separate from or not integrated with the pre-amplifier 202. The AED 100 of the illustrated example uses the data extractor 420 to generate the demodulated signal data 425 based on mixed acoustic emission data obtained from the mixer 415. Alternatively, the example AED 100 may process the example acoustic emission signal 108 prior to the example pre-amplifier 202 conditioning the acoustic emission signal 108. In the illustrated example, the transmitter 430, the configuration selector 440, the database 450, and the presentation device 455 are separate from or not integrated with the pre-amplifier 202. Alternatively, the example transmitter 430, the example configuration selector 440, the example database 450, and/or the example presentation device 455 may be integrated with the example AED 100, the example pre-amplifier 202, etc. The acoustic emission sensor 200 of the illustrated example transmits information to the data acquisition system 124 via the transmitter 430. For example, the transmitter 430 may transmit the acoustic emission signal 108, the demodulated signal data 425, etc., to the data acquisition system 124 via the network 435.

In connection with the illustrated example of FIG. 5, the structure, function, and/or operation of each of the AED 100, the input amplifier 400, the filter 405, the chirp generator 410, the mixer 415, the data extractor 420, the demodulated signal data 425, the transmitter 430, the network 435, the configuration selector 440, the configuration selection data 445, the database 450, and the presentation device 455 is/are the same as the corresponding structure, function, and/or operation of the AED 100, the input amplifier 400, the filter 405, the chirp generator 410, the mixer 415, the data extractor 420, the demodulated signal data 425, the transmitter 430, the network 435, the configuration selector 440, the configuration selection data 445, the database 450, and the presentation device 455 of FIG. 4 described above. Thus, in the interest of brevity, the structure, function and/or operation of these components, structures and data of the acoustic emission sensor 200 of FIG. 5 are not repeated herein.

While an example manner of implementing the example acoustic emission sensor 200, the example pre-amplifier 202, and the example AED 100 of FIG. 2 is illustrated in FIG. 5, one or more of the elements, processes and/or devices illustrated in FIG. 5 may be combined, divided, re-arranged, omitted, eliminated and/or implemented in any other way. Further, the example AED 100, the example pre-amplifier 202, the example input amplifier 400, the example filter 405, the example chirp generator 410, the example mixer 415, the example data extractor 420, the example transmitter 430, the example configuration selector 440, the example database 450, the example presentation device 455, and/or, more generally, the example acoustic emission sensor 200 of FIG. 5 may be implemented by hardware, software, firmware and/or any combination of hardware, software and/or firmware. Thus, for example, any of the example AED 100, the example pre-amplifier 202, the example input amplifier 400, the example filter 405, the example chirp generator 410, the example mixer 415, the example data extractor 420, the example transmitter 430, the example configuration selector 440, the example database 450, the example presentation device 455, and/or, more generally, the example acoustic emission sensor 102 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example AED 100, the example pre-amplifier 202, the example input amplifier 400, the example filter 405, the example chirp generator 410, the example mixer 415, the example data extractor 420, the example transmitter 430, the example configuration selector 440, the example database 450, and/or the example presentation device 455 is/are hereby expressly defined to include a non-transitory computer readable storage device or storage disk such as a memory, a digital versatile disk (DVD), a compact disk (CD), a Blu-ray disk, etc. including the software and/or firmware. Further still, the example acoustic emission sensor 200 of FIG. 2 may include one or more elements, processes and/or devices in addition to, or instead of, those illustrated in FIG. 5, and/or may include more than one of any or all of the illustrated elements, processes and devices.

Figure 6:
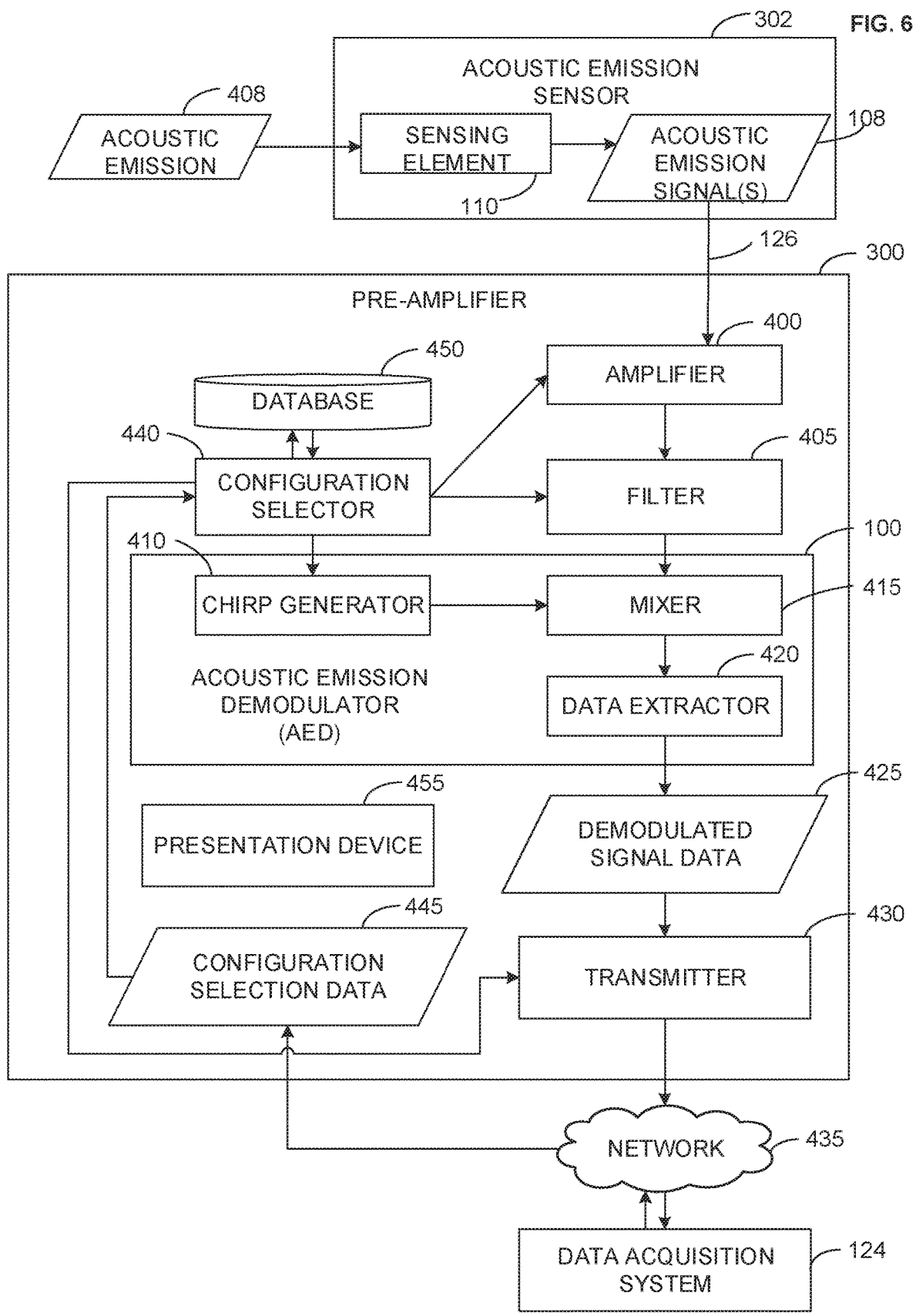

FIG. 6 is a block diagram of an example implementation of the example AED 100 of FIGS. 1-5, and the example pre-amplifier 300 and the example acoustic emission sensor 302 of FIG. 3 in accordance with the teachings of this disclosure. In the illustrated example, the pre-amplifier 300 is not included in or integrated with the acoustic emission sensor 302. For example, the acoustic emission sensor 302 may generate the acoustic emission signal 108 of FIGS. 1-5 based on the sensing element 110 of FIGS. 1-5 sensing, measuring, and/or detecting the acoustic emission 408 of FIGS. 4-5. In such an example, the acoustic emission sensor 302 may transmit the acoustic emission signal 108 to the pre-amplifier 300 via the cable 126 of FIG. 3.

In the illustrated example, the pre-amplifier 300 generates pre-amplified acoustic emission data via the input amplifier 400 and the filter 405. The AED 100 of the illustrated example uses the data extractor 420 to generate the demodulated signal data 425 based on the mixed acoustic emission data obtained from the mixer 415. Alternatively, the example AED 100 may process the example acoustic emission signal 108 prior to the example input amplifier 400 and/or the example filter 405 conditioning the acoustic emission signal 108. In the illustrated example, the pre-amplifier 300 transmits information (e.g., acoustic emission signal 108, the demodulated signal data 425, etc.) to the data acquisition system 124 via the transmitter 430. Alternatively, the example transmitter 430 and/or the example database 450 may be integrated into the example AED 100.

In connection with the illustrated example of FIG. 6, the structure, function, and/or operation of each of the AED 100, the input amplifier 400, the filter 405, the chirp generator 410, the mixer 415, the data extractor 420, the demodulated signal data 425, the transmitter 430, the network 435, the configuration selector 440, the configuration selection data 445, the database 450, and the presentation device 455 is/are the same as the corresponding structure, function, and/or operation of the AED 100, the input amplifier 400, the filter 405, the chirp generator 410, the mixer 415, the data extractor 420, the demodulated signal data 425, the transmitter 430, the network 435, the configuration selector 440, the configuration selection data 445, the database 450, and the presentation device 455 of FIGS. 4-5 described above. Thus, in the interest of brevity, the structure, function and/or operation of these components, structures and data of the pre-amplifier 300 of FIG. 6 are not repeated herein.

While an example manner of implementing the example pre-amplifier 300 and the AED 100 of FIG. 3 is illustrated in FIG. 6, one or more of the elements, processes and/or devices illustrated in FIG. 6 may be combined, divided, re-arranged, omitted, eliminated and/or implemented in any other way. Further, the example AED 100, the example input amplifier 400, the example filter 405, the example chirp generator 410, the example mixer 415, the example data extractor 420, the example transmitter 430, the example configuration selector 440, the example database 450, the example presentation device 455, and/or, more generally, the example pre-amplifier 300 of FIG. 6 may be implemented by hardware, software, firmware and/or any combination of hardware, software and/or firmware. Thus, for example, any of the example AED 100, the example input amplifier 400, the example filter 405, the example chirp generator 410, the example mixer 415, the example data extractor 420, the example transmitter 430, the example configuration selector 440, the example database 450, the example presentation device 455, and/or, more generally, the example pre-amplifier 300 of FIG. 6 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example AED 100, the example input amplifier 400, the example filter 405, the example chirp generator 410, the example mixer 415, the example data extractor 420, the example transmitter 430, the example configuration selector 440, the example database 450, and the example presentation device 455, is/are hereby expressly defined to include a non-transitory computer readable storage device or storage disk such as a memory, a digital versatile disk (DVD), a compact disk (CD), a Blu-ray disk, etc. including the software and/or firmware. Further still, the example pre-amplifier 300 of FIG. 6 may include one or more elements, processes and/or devices in addition to, or instead of, those illustrated in FIG. 6, and/or may include more than one of any or all of the illustrated elements, processes and devices.

Figure 7:
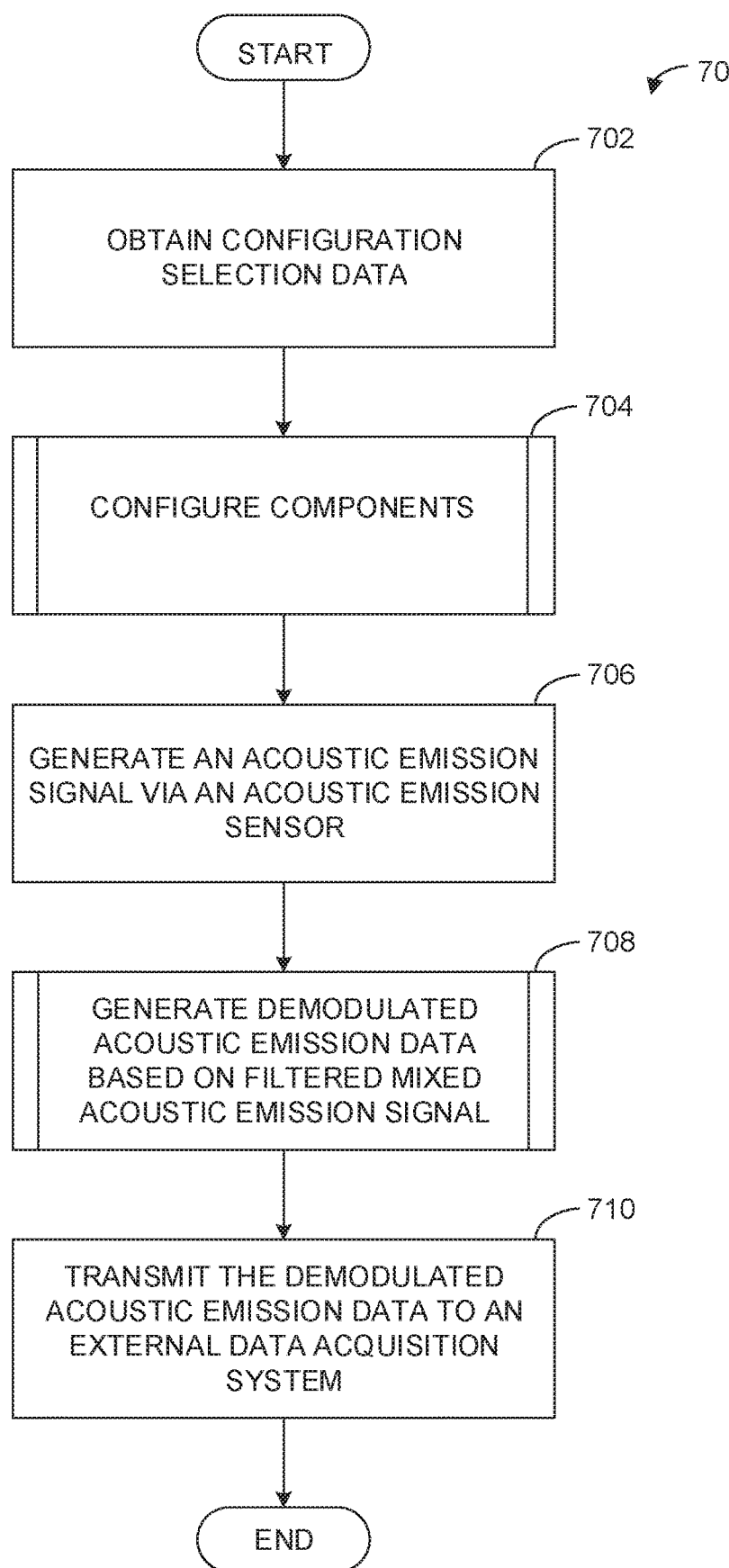
Figure 8:
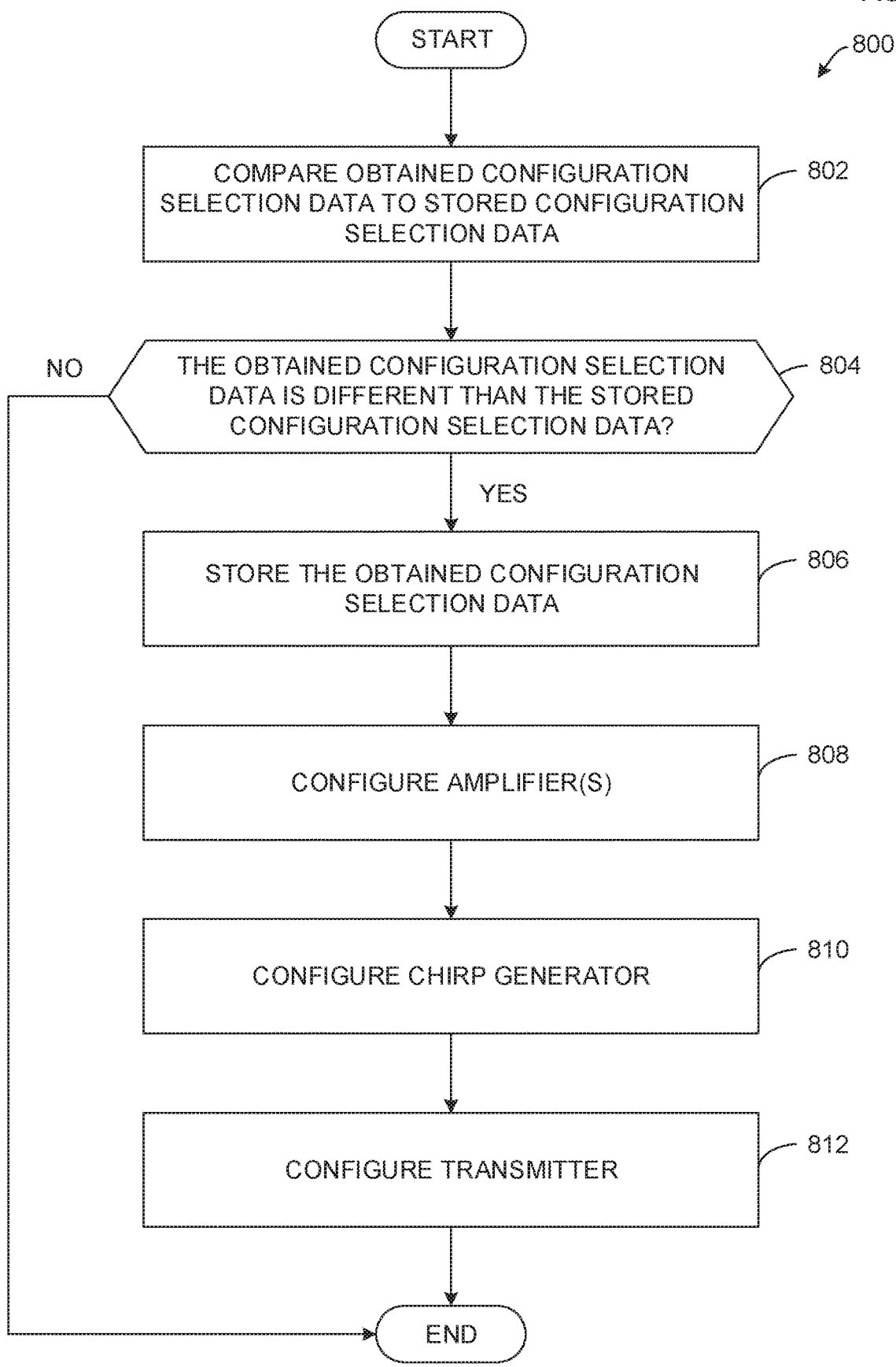

Flowcharts representative of example methods for implementing the example acoustic emission sensor 102 of FIG. 1, the example acoustic emission sensor 200 of FIG. 2, and/or the example pre-amplifier 300 of FIG. 3 are shown in FIGS. 7-9. In these examples, the methods may be implemented using machine readable instructions which comprise a program for execution by a processor such as a first processor 1112 shown in the example processor platform 1100 discussed below in connection with FIG. 11, a second processor 1212 shown in the example processor platform 1200 discussed below in connection with FIG. 12, and/or a third processor 1312 shown in the example processor platform 1300 discussed below in connection with FIG. 13. The program may be embodied in software stored on a non-transitory computer readable storage medium such as a CD-ROM, a floppy disk, a hard drive, a DVD, a Blu-ray disk, or a memory associated with the processors 1112, 1212, 1312, but the entire program and/or parts thereof could alternatively be executed by a device other than the processors 1112, 1212, 1312, and/or embodied in firmware or dedicated hardware. Further, although the example program is described with reference to the flowcharts illustrated in FIGS. 7-9, many other methods of implementing the example acoustic emission sensor 102 of FIG. 1, the example acoustic emission sensor 200 of FIG. 2, and/or the example pre-amplifier 300 of FIG. 3 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 7-9 may be implemented using coded instructions (e.g., computer and/or machine readable instructions) stored on a non-transitory computer and/or machine readable medium such as a hard disk drive, a flash memory, a read-only memory, a CD, a DVD, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open ended in the same manner as the term "comprising" and "including" are open ended.

FIG. 7 is a flowchart representative of an example method 700 that may be performed by the example acoustic emission sensor 102 of FIG. 1, the example acoustic emission sensor 200 of FIG. 2, and/or the example pre-amplifier 300 of FIG. 3 to generate demodulated acoustic emission data. The example method 700 begins at block 702 when the example acoustic emission sensors 102, 200 of FIGS. 1-2 and/or the pre-amplifier 300 of FIG. 3 obtain configuration selection data. For example, the configuration selector 440 of FIGS. 4-6 may obtain the configuration selection data 445 of FIGS. 4-6 from the data acquisition system 124 of FIGS. 1-6 via the network 435 of FIGS. 4-6.

At block 704, the example acoustic emission sensors 102, 200 of FIGS. 1-2 and/or the pre-amplifier 300 of FIG. 3 configure components. For example, the configuration selector 440 of FIGS. 4-6 may configure one or more of the input amplifier 400, the filter 405, the chirp generator 410, the transmitter 430, etc., of FIGS. 4-6 based on the obtained configuration selection data 445. An example process that may be used to implement block 704 is described below in connection with FIG. 8.

At block 706, the example acoustic emission sensors 102, 200, 302 of FIGS. 1-3 generate an acoustic emission signal. For example, the acoustic emission sensor 102 of FIG. 1 may generate the acoustic emission signal 108 of FIG. 1 in response to acoustic emissions (e.g., transient elastic waves from an acoustic emission source) sensed, measured, and/or detected via a sensing element (e.g., one or more piezoelectric crystals) of the acoustic emission sensor 102.

At block 708, the example acoustic emission sensors 102, 200 of FIGS. 1-2 and/or the pre-amplifier 300 of FIG. 3 generate demodulated acoustic emission data based on a filtered mixed acoustic emission signal. For example, the AED 100 of FIGS. 1-6 may generate a chirp signal that increases or decreases in frequency with respect to time via the chirp generator 410 of FIGS. 4-6. In such an example, the AED 100 may combine the chirp signal with a pre-amplified acoustic emission signal via the mixer 415 of FIGS. 4-6 to generate a mixed acoustic emission signal. In such an example, the AED 100 may filter the mixed acoustic emission signal to generate a filtered mixed acoustic emission signal via the data extractor 420. In such an example, the AED 100 may extract demodulated acoustic emission data such as spectral data, time-averaged data, etc., and/or a combination thereof from the mixed acoustic emission signal via the data extractor 420. An example process that may be used to implement block 708 is described below in connection with FIG. 9.

At block 710, the example acoustic emission sensors 102, 200 of FIGS. 1-2 and/or the pre-amplifier 300 of FIG. 3 transmit the demodulated acoustic emission data to an external data acquisition system. For example, the transmitter 430 of FIGS. 4-6 may transmit the spectral data, the time-averaged data, etc., and/or a combination thereof to the data acquisition system 124 of FIGS. 1-6. In response to transmitting the demodulated acoustic emission data to the external data acquisition system, the example method 700 concludes.

FIG. 8 is a flowchart representative of an example method 800 that may be performed by the example acoustic emission sensor 102 of FIG. 1, the example acoustic emission sensor 200 of FIG. 2, and/or the example pre-amplifier 300 of FIG. 3 to configure one or more components used to generate acoustic emission spectral data. The example process of FIG. 8 may be used to implement the operation of block 704 of FIG. 7. The example method 800 begins at block 802 when the example acoustic emission sensors 102, 200 of FIGS. 1-2 and/or the pre-amplifier 300 of FIG. 3 compare obtained configuration selection data to stored configuration selection data. For example, the configuration selector 440 of FIGS. 4-6 may compare a first value of a sweep time for the chirp generator 410 of FIGS. 4-6 to a second value of the sweep time stored in the database 450 of FIGS. 4-6.

At block 804, the example acoustic emission sensors 102, 200 of FIGS. 1-2 and/or the pre-amplifier 300 of FIG. 3 determine whether the obtained configuration selection data is different than the stored configuration selection data. For example, the configuration selector 440 of FIGS. 4-6 may store the first value in place of the second value in the database 450 of FIGS. 4-6 when the first and the second values are different. In another example, the configuration selector 440 may discard the first value when the first and the second values are the same.

If, at block 804, the example acoustic emission sensors 102, 200 of FIGS. 1-2 and/or the pre-amplifier 300 of FIG. 3 determine that the obtained configuration selection data is not different than the stored configuration selection data, the example method 800 concludes. If, at block 804, the example acoustic emission sensors 102, 200 of FIGS. 1-2 and/or the pre-amplifier 300 of FIG. 3 determine that the obtained configuration selection data is different than the stored configuration selection data, then, at block 806, the example acoustic emission sensors 102, 200 of FIGS. 1-2 and/or the pre-amplifier 300 of FIG. 3 store the obtained configuration selection data. For example, the configuration selector 440 of FIGS. 4-6 may store the first value of the sweep time in place of the second value of the sweep time when the first and the second values are different.

At block 808, the example acoustic emission sensors 102, 200 of FIGS. 1-2 and/or the pre-amplifier 300 of FIG. 3 configure one or more amplifiers. For example, the configuration selector 440 of FIG. 4 may configure a gain of the input amplifier 400 of FIG. 4 based on a stored value of the gain in the database 450 of FIG. 4.

At block 810, the example acoustic emission sensors 102, 200 of FIGS. 1-2 and/or the pre-amplifier 300 of FIG. 3 configure a chirp generator. For example, the configuration selector 440 of FIG. 4 may configure a start frequency value, an end frequency value, a sweep time value, etc., of the chirp generator 410 of FIG. 4 based on a stored value of the start frequency value, the end frequency value, the sweep time value, etc., in the database 450 of FIG. 4.

At block 812, the example acoustic emission sensors 102, 200 of FIGS. 1-2 and/or the pre-amplifier 300 of FIG. 3 configure a transmitter. For example, the configuration selector 440 of FIG. 4 may configure an IP address and a port number of the transmitter 430 to utilize Ethernet-based communication. In response to the example acoustic emission sensors 102, 200 of FIGS. 1-2 and/or the pre-amplifier 300 of FIG. 3 configuring the transmitter, the example method 800 concludes.

FIG. 9 is a flowchart representative of an example method 900 that may be performed by the example acoustic emission sensor 102 of FIG. 1, the example acoustic emission sensor 200 of FIG. 2, and/or the example pre-amplifier 300 of FIG. 3 to generate demodulated acoustic emission data. The example process of FIG. 9 may be used to implement the operation of block 708 of FIG. 7. The example method 900 begins at block 902 when the example acoustic emission sensor 102 of FIG. 1, the example acoustic emission sensor 200 of FIG. 2, and/or the example pre-amplifier 300 of FIG. 3 generate chirp signal(s) based on a start frequency value, an end frequency value, and a sweep time value. For example, the chirp generator 410 of FIGS. 4-6 may generate a first chirp signal increasing in frequency with respect to time based on a start frequency value of 9.55 MHz, an end frequency value of 9.95 MHz, and a sweep time value of 100 milliseconds. For example, the chirp generator 410 may generate the first chirp signal at the start frequency value of 9.55 MHz, subsequently increasing in frequency up to and including 9.95 MHz.

At block 904, the example acoustic emission sensor 102 of FIG. 1, the example acoustic emission sensor 200 of FIG. 2, and/or the example pre-amplifier 300 of FIG. 3 combine a pre-amplified acoustic emission signal with the chirp signal(s) to generate a mixed acoustic emission signal. For example, the mixer 415 of FIGS. 4-6 may combine a pre-amplified acoustic emission signal based on the acoustic emission signal 108 of FIGS. 1-6 with the first chirp signal to generate a mixed acoustic emission signal. For example, the mixer 415 may combine a pre-amplified acoustic emission signal 1006 of FIG. 10A with a chirp signal 1016 of FIG. 10B at a frequency value of 9.75 MHz to generate a first and a second single sideband 1010, 1012 of a mixed acoustic emission signal 1014.

At block 906, the example acoustic emission sensor 102 of FIG. 1, the example acoustic emission sensor 200 of FIG. 2, and/or the example pre-amplifier 300 of FIG. 3 filter the mixed acoustic emission signal to generate a filtered mixed acoustic emission signal. For example, the data extractor 420 of FIGS. 4-6 may remove spectral information from the mixed acoustic emission signal obtained from the mixer 415 of FIGS. 4-6. For example, the data extractor 420 of FIGS. 4-6 may include a band-pass filter to remove spectral information outside of a frequency range of 9.75 MHz to 10.25 MHz from the mixed acoustic emission signal. For example, the data extractor 420 may use a band-pass filter to isolate the first or the second single sidebands 1010, 1012 of FIG. 10B to only include the mixed acoustic emission signal 1014 of FIG. 10B within the frequency range of 9.75 MHz to 10.25 MHz to generate a filtered mixed acoustic emission signal 1018 as depicted in FIG. 10C. Additionally or alternatively, the data extractor 420 may filter the mixed acoustic emission signal 1014 of FIG. 10B within the intermediate bandwidth 1008 of FIG. 10C with respect to a 10 MHz intermediate center frequency 1020 to generate a filtered mixed acoustic emission signal 1018 as depicted in FIG. 10C.

At block 908, the example acoustic emission sensor 102 of FIG. 1, the example acoustic emission sensor 200 of FIG. 2, and/or the example pre-amplifier 300 of FIG. 3 extract demodulated acoustic emission data from the filtered mixed acoustic emission signal. For example, the data extractor 420 of FIGS. 4-6 may generate the demodulated signal data 425 of FIGS. 4-6 that includes spectral data, time-averaged data, etc., that includes root mean square data, average signal level data, etc. In such an example, the demodulated signal data 425 of FIGS. 4-6 may include an amplitude, an energy, frequency information, ASL data, RMS data, etc., corresponding to the acoustic emission signal 108 of FIGS. 1-6. For example, the data extractor 420 may sample the filtered mixed acoustic emission signal 1018 of FIG. 10C at an intermediate center frequency 1020 of 10 MHz within the intermediate frequency bandwidth 1008 of 50 kHz.

At block 910, the example acoustic emission sensor 102 of FIG. 1, the example acoustic emission sensor 200 of FIG. 2, and/or the example pre-amplifier 300 of FIG. 3 correlate extracted demodulated acoustic emission data to measurement center frequency to generate a spectrum of an acoustic emission signal. For example, the data extractor 420 may map the sample of the spectral information of the second single sideband acoustic emission signal 1012 of FIG. 10C to the measurement center frequency 1002 of FIG. 10A to generate spectral information. The example data extractor 420 may aggregate the spectral information for a plurality of samples of spectral information for a plurality of measurement center frequencies based on a chirp signal increasing or decreasing in frequency within a range of 9.55 MHz to 9.95 MHz to generate a low-resolution and high-bandwidth spectrum 1022 (e.g., demodulated acoustic emission data 1022) of FIG. 10D.

At block 912, the example acoustic emission sensor 102 of FIG. 1, the example acoustic emission sensor 200 of FIG. 2, and/or the example pre-amplifier 300 of FIG. 3 determine whether to generate chirp signals using another frequency range of interest. For example, the chirp generator 410 may determine to generate second chirp signals increasing in frequency with respect to time based on a second start frequency value of 50 kHz, a second end frequency value of 450 kHz, and a second sweep time value of 150 milliseconds.

If, at block 912, the example acoustic emission sensor 102 of FIG. 1, the example acoustic emission sensor 200 of FIG. 2, and/or the example pre-amplifier 300 of FIG. 3 determine that there is another frequency range of interest, control returns to block 902 to generate another chirp signal at another frequency range of interest (e.g., chirp signals based on the second start frequency value, the second end frequency value, the second sweep time value, etc., and/or a combination thereof), otherwise the example method 900 concludes.

Figure 10A:
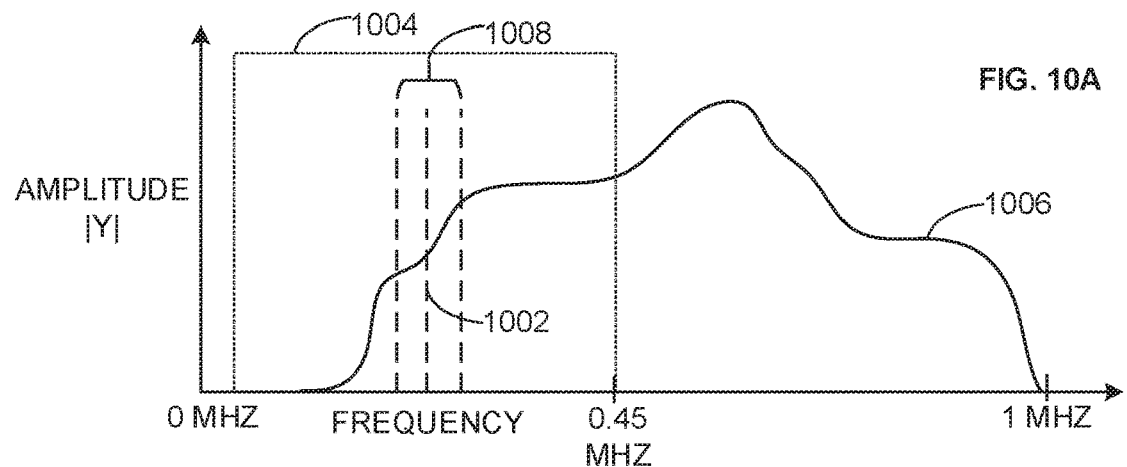

FIG. 10A is an example graph depicting the example measurement center frequency 1002 within the example measurement bandwidth 1004 of the example acoustic emission signal 1006 as a function of frequency and amplitude. In the illustrated example, the measurement center frequency 1002 is 250 kHz within an intermediate frequency bandwidth 1008. Alternatively, any other measurement center frequency may be used. In the illustrated example, the intermediate frequency bandwidth 1008 is 50 kHz. Alternatively, any other intermediate frequency bandwidth may be used. The measurement center frequency 1002 of the illustrated example represents a measure of a central frequency between a lower and an upper cutoff of the measurement bandwidth 1004. In the illustrated example, the measurement bandwidth 1004 is 50-450 kHz. Alternatively, any other measurement bandwidth may be used. The measurement bandwidth 1004 of the illustrated example represents a measurement range of interest for the acoustic emission signal 1006. For example, the acoustic emission signal 1006 of the illustrated example may correspond to the acoustic emission signal 108 of FIGS. 4-6.

Figure 10B:
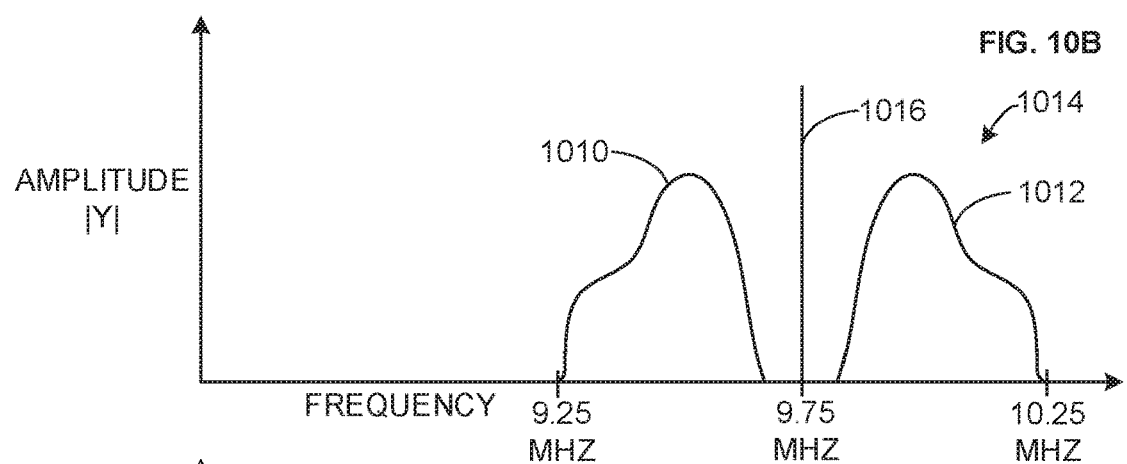
Figure 10C:
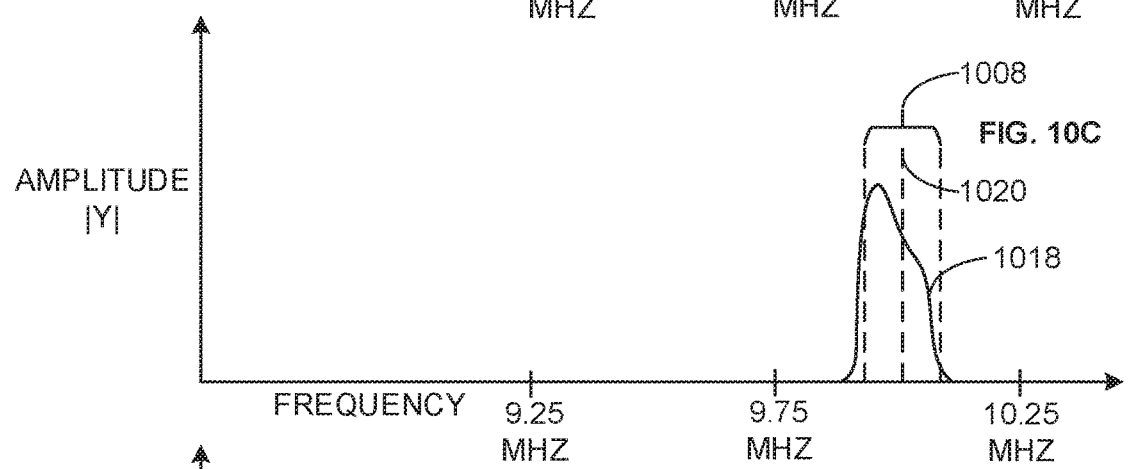

FIG. 10B is an example graph depicting the first and the second sidebands 1010, 1012 of the mixed acoustic emission signal 1014. In the illustrated example, the first and the second sidebands 1010, 1012 are shifted away from the measurement center frequency 1002 of FIG. 10A based on the AED 100 of FIGS. 1-6 (e.g., the mixer 415 of FIGS. 4-6) combining the chirp signal 1016 of FIG. 10B with the acoustic emission signal 1006 of FIG. 10A. The first sideband 1010 of the illustrated example is a mirror of the second sideband 1012 about the chirp signal 1016 at a chirp frequency of 9.75 MHz.

FIG. 10C is an example graph depicting the filtered mixed acoustic emission signal 1018 as a function of frequency and amplitude. In the illustrated example of FIG. 10C, the AED 100 of FIGS. 1-6 (e.g., the data extractor 420 of FIGS. 4-6) generates the filtered mixed acoustic emission signal 1018 by isolating data included in the mixed acoustic emission signal 1014 of FIG. 10B within the range of 9.75 MHz to 10.25 MHz. In the illustrated example, the AED 100 of FIGS. 1-6 (e.g., the data extractor 420 of FIGS. 4-6) is sampling spectral information of the filtered mixed acoustic emission signal 1018 at the intermediate center frequency 1020 within the intermediate frequency bandwidth 1008 of FIG. 10A. In the illustrated example of FIG. 10C, the intermediate center frequency 1020 is 10 MHz. Alternatively, any other intermediate center frequency may be used. In the illustrated example of FIG. 10C, the intermediate frequency bandwidth 1008 is 50 kHz. Alternatively, any other intermediate frequency bandwidth may be used.

Figure 10D:
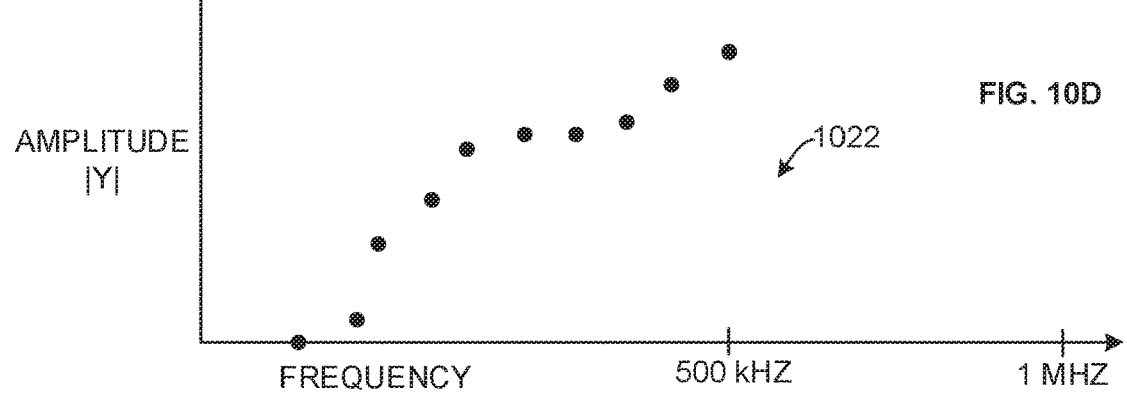

FIG. 10D is an example graph depicting the example demodulated acoustic emission data 1022 as a function of frequency and amplitude. The example demodulated acoustic emission data 1022 of FIG. 10D is based on at least the sampling of the spectral information of the second single sideband 1012 of FIG. 10B. In the illustrated example of FIG. 10D, the demodulated acoustic emission data 1022 is a low-resolution and high-bandwidth spectrum of the acoustic emission signal 1006 of FIG. 10A. The demodulated acoustic emission data 1022 of FIG. 10D can be processed by the AED 100 of FIGS. 1-6 (e.g., the data extractor 420 of FIGS. 4-6) to generate ASL data, RMS data, etc.

In the illustrated example of FIG. 10D, the AED 100 generates the demodulated acoustic emission data 1022 representing a spectrum of the acoustic emission signal 1006 based on increasing (e.g., continuously increasing) or decreasing (e.g., continuously decreasing) the frequency of the chirp signal 1016 within the measurement bandwidth 1004, generating pairs of single sideband acoustic emission signals based on the chirp frequency, and sampling spectral information corresponding to the generated pairs of single sideband acoustic emission signals.

FIGS. 10A-10D are example representations of processing the acoustic emission signal 1006 using the chirp signal 1016. In response to the chirp signal 1016 moving continuously from the start frequency to the end frequency, the measurement center point is swept through the measurement bandwidth 1004 of FIG. 10A. At the instantaneous chirp frequency, the example AED 100 generates the pair of single sidebands 1010, 1012 of the mixed acoustic emission signal 1014 as illustrated in FIG. 10B. In response to generating the pair of single sidebands 1010, 1012, the example AED 100 filters the mixed acoustic emission signal 1014 to generate the filtered mixed acoustic emission signal 1018 as illustrated in FIG. 10C, and samples spectral information corresponding to the filtered mixed acoustic emission signal 1018 as illustrated in FIG. 10C. The spectral information corresponding to the measurement bandwidth 1004 of FIG. 10A can be processed by the example AED 100 and represented as the demodulated acoustic emission data 1022 as illustrated in FIG. 10D.

In some examples, in response to the measurement center point sweeping through the measurement bandwidth 1004, the example AED 100 adjusts the measurement bandwidth 1004 to another measurement bandwidth. For example, the chirp generator 410 may adjust the measurement bandwidth from 50-450 kHz to 450 kHz to 900 kHz. The example AED 100 may generate demodulated acoustic emission data as described above in the adjusted measurement bandwidth of 450 kHz to 900 kHz. By adjusting (e.g., iteratively adjusting) the measurement bandwidth to encompass a measurement range of interest for the acoustic emission signal 1006, the example AED 100 may generate a low-resolution and high-bandwidth spectrum of the acoustic emission signal 1006 as illustrated in FIG. 10D.

Figure 11:
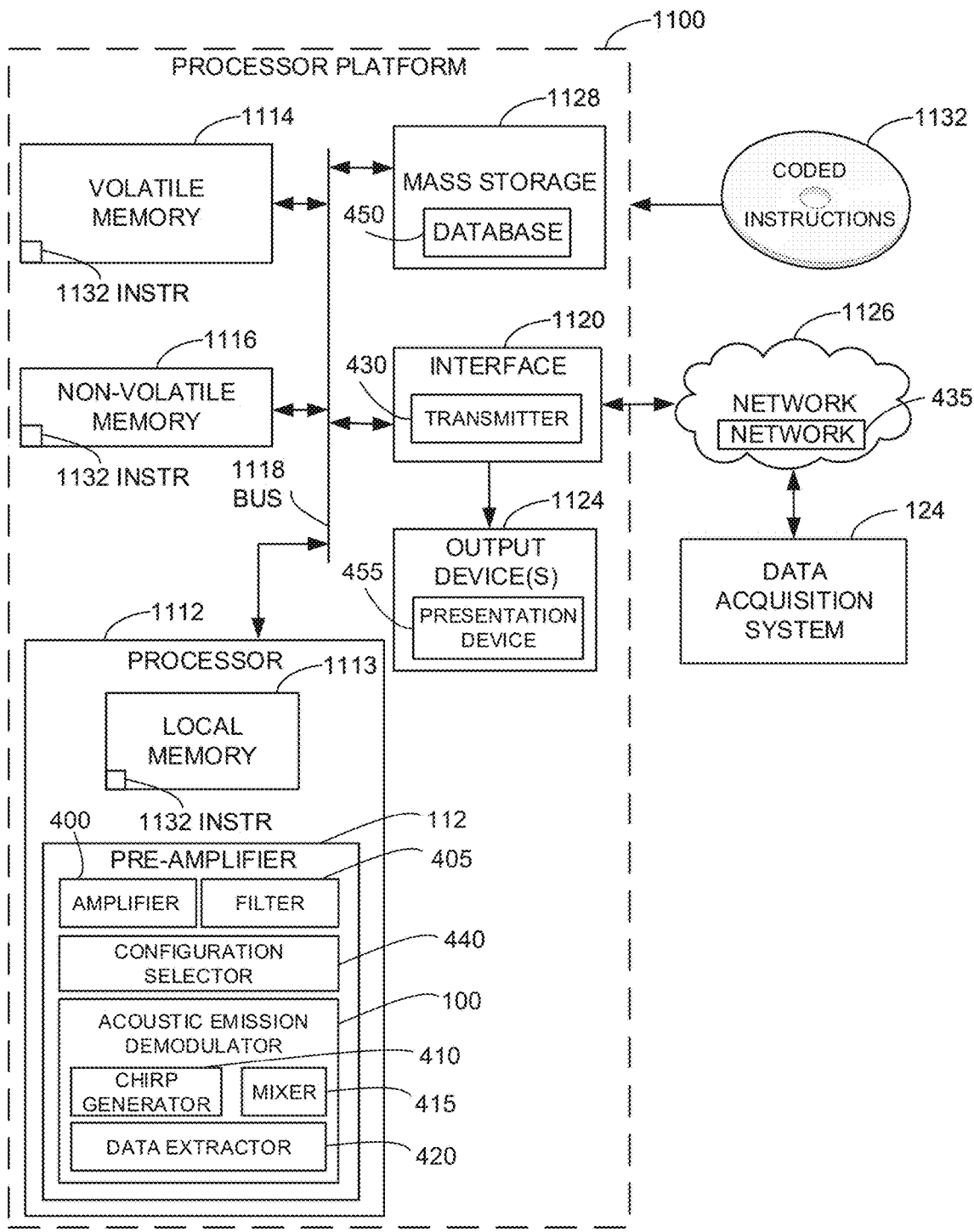

FIG. 11 is a block diagram of an example processor platform 1100 capable of executing instructions to implement the methods of FIGS. 7-9 and the example acoustic emission sensor 102 of FIG. 1. The processor platform 1100 of the illustrated example includes a processor 1112. The processor 1112 of the illustrated example is hardware. For example, the processor 1112 can be implemented by one or more integrated circuits, logic circuits, microprocessors or controllers from any desired family or manufacturer. The hardware processor may be a semiconductor based (e.g., silicon based) device. In this example, the processor 1112 implements the example AED 100, the example pre-amplifier 112, the example input amplifier 400, the example filter 405, the example chirp generator 410, the example mixer 415, the example data extractor 420, and the example configuration selector 440 of FIG. 4.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), and/or a peripheral component interconnect (PCI) express interface.

One or more output devices 1124 are connected to the interface circuit 1120 of the illustrated example. The output devices 1124 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1120 of the illustrated example, thus, typically includes a graphics driver card, a graphics driver chip and/or a graphics driver processor. The output device 1124 implements the example presentation device 455 of FIG. 4.

The interface circuit 1120 of the illustrated example also includes a communication device such as a transmitter, a receiver, a transceiver, a modem and/or network interface card to facilitate exchange of data with external machines (e.g., computing devices of any kind) such as the data acquisition system 124 of FIGS. 1-6 via a network 1126 (e.g., an Ethernet connection, a digital subscriber line (DSL), a telephone line, coaxial cable, a cellular telephone system, etc.). The interface circuit 1120 implements the example transmitter 430 of FIG. 4. The network 1126 implements the example network 435 of FIG. 4.

The processor platform 1100 of the illustrated example also includes one or more mass storage devices 1128 for storing software and/or data. Examples of such mass storage devices 1028 include floppy disk drives, hard drive disks, compact disk drives, Blu-ray disk drives, redundant array of independent disks (RAID) systems, and DVD drives. The mass storage device 1128 implements the example database 450 of FIG. 4.

Coded instructions 1132 to implement the methods of FIGS. 7-9 may be stored in the mass storage device 1128, in the volatile memory 1114, in the non-volatile memory 1116, and/or on a removable non-transitory computer readable storage medium such as a CD or DVD.

Figure 12:
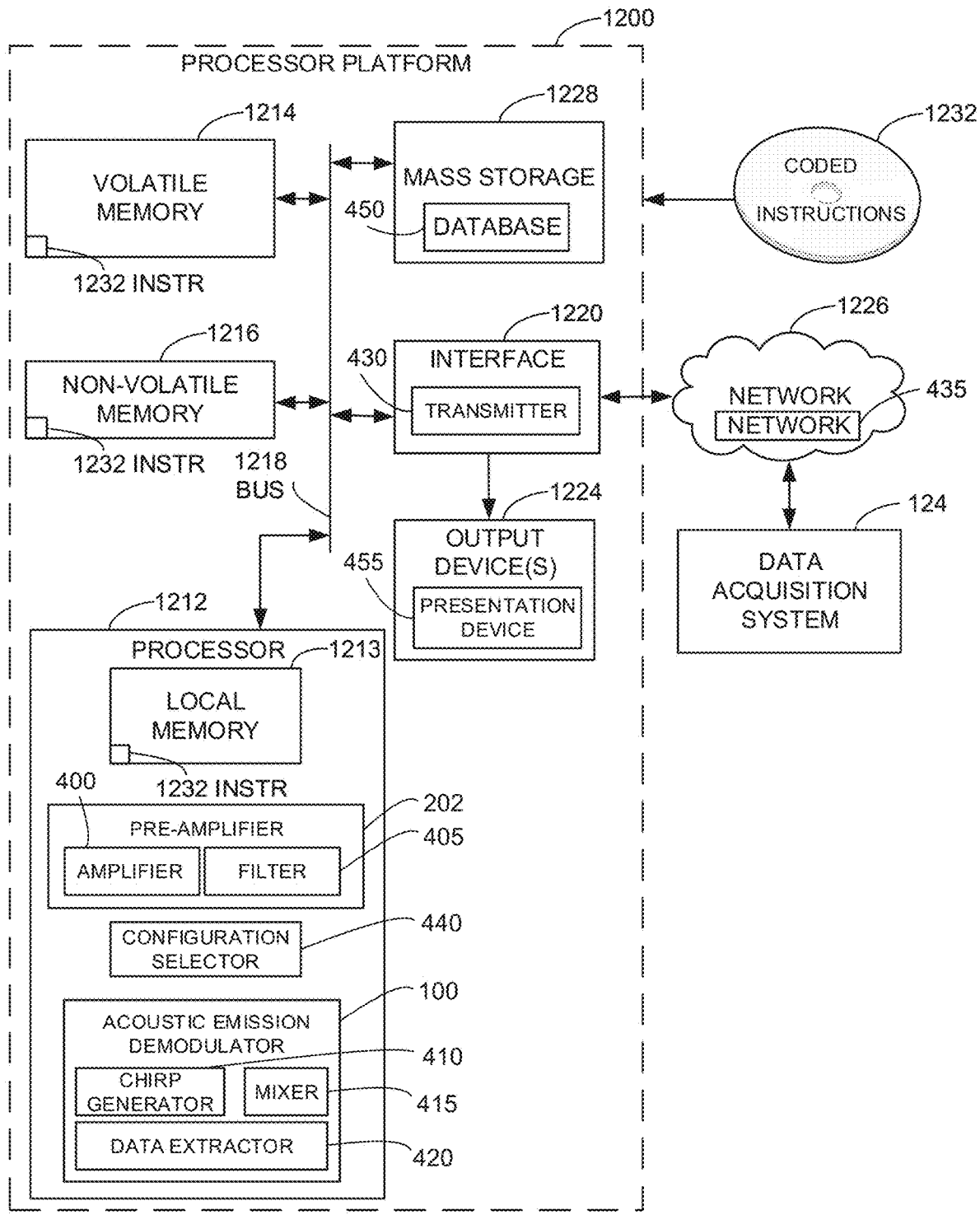

FIG. 12 is a block diagram of an example processor platform 1200 capable of executing instructions to implement the methods of FIGS. 7-9 and the example acoustic emission sensor 200 of FIG. 2. The processor platform 1200 of the illustrated example includes a processor 1212. The processor 1212 of the illustrated example is hardware. For example, the processor 1212 can be implemented by one or more integrated circuits, logic circuits, microprocessors or controllers from any desired family or manufacturer. The hardware processor may be a semiconductor based (e.g., silicon based) device. In this example, the processor 1212 implements the example AED 100, the example pre-amplifier 202, the example input amplifier 400, the example filter 405, the example chirp generator 410, the example mixer 415, the example data extractor 420, and the example configuration selector 440 of FIG. 5.

The processor 1212 of the illustrated example includes a local memory 1213 (e.g., a cache). The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), and/or a peripheral component interconnect (PCI) express interface.

One or more output devices 1224 are connected to the interface circuit 1220 of the illustrated example. The output devices 1224 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1220 of the illustrated example, thus, typically includes a graphics driver card, a graphics driver chip and/or a graphics driver processor. The output device 1224 implements the example presentation device 455 of FIG. 5.

The interface circuit 1220 of the illustrated example also includes a communication device such as a transmitter, a receiver, a transceiver, a modem and/or network interface card to facilitate exchange of data with external machines (e.g., computing devices of any kind) such as the data acquisition system 124 of FIGS. 1-6 via a network 1226 (e.g., an Ethernet connection, a digital subscriber line (DSL), a telephone line, coaxial cable, a cellular telephone system, etc.). The interface circuit 1220 implements the example transmitter 430 of FIG. 5. The network 1226 implements the example network 435 of FIG. 5.

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, redundant array of independent disks (RAID) systems, and DVD drives. The mass storage device 1228 implements the example database 450 of FIG. 5.

Coded instructions 1232 to implement the methods of FIGS. 7-9 may be stored in the mass storage device 1228, in the volatile memory 1214, in the non-volatile memory 1216, and/or on a removable non-transitory computer readable storage medium such as a CD or DVD.

Figure 13:
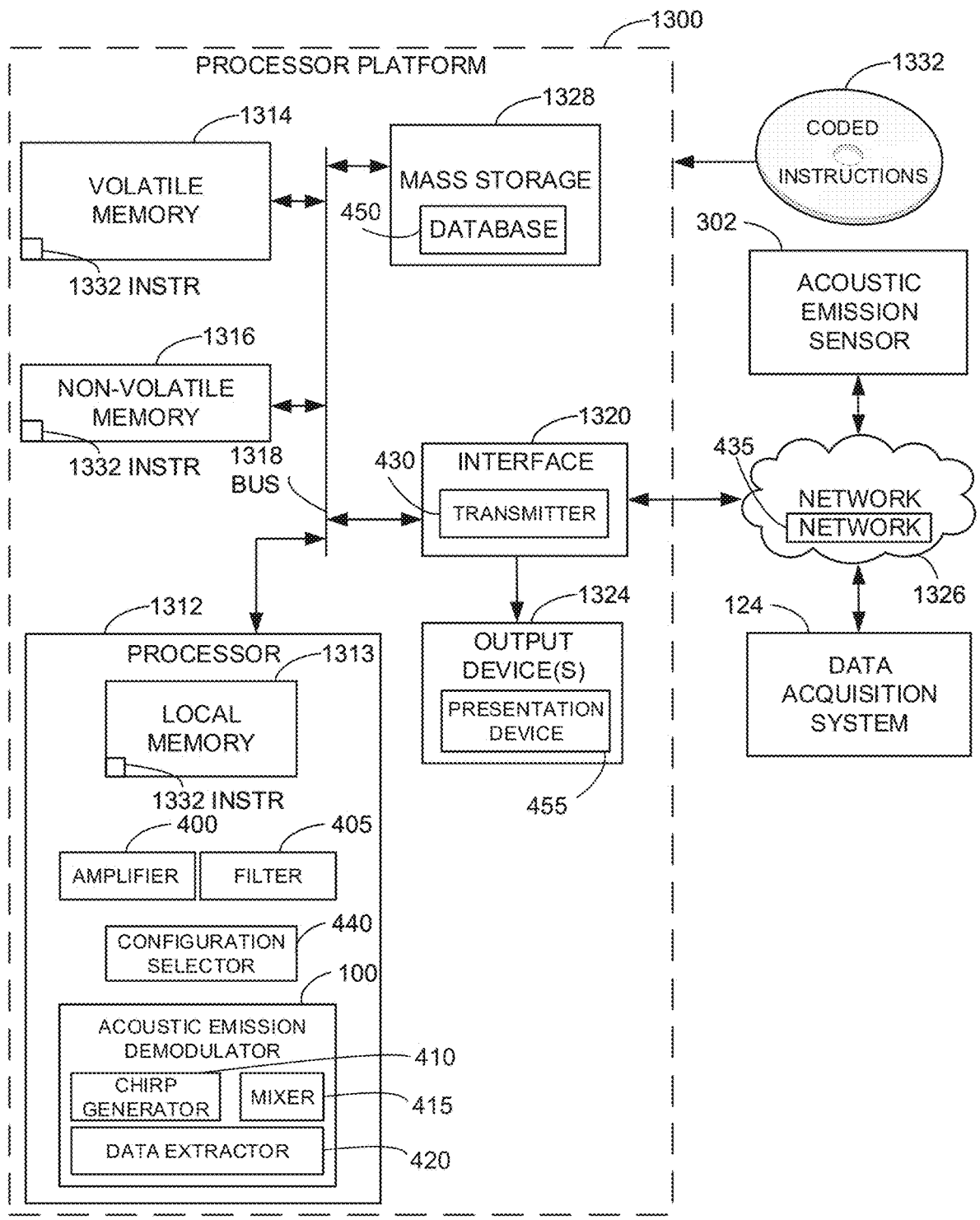

FIG. 13 is a block diagram of an example processor platform 1300 capable of executing instructions to implement the methods of FIGS. 7-9 and the example pre-amplifier 300 of FIG. 3. The processor platform 1300 of the illustrated example includes a processor 1312. The processor 1312 of the illustrated example is hardware. For example, the processor 1312 can be implemented by one or more integrated circuits, logic circuits, microprocessors or controllers from any desired family or manufacturer. The hardware processor may be a semiconductor based (e.g., silicon based) device. In this example, the processor 1312 implements the example AED 100, the example input amplifier 400, the example filter 405, the example chirp generator 410, the example mixer 415, the example data extractor 420, and the example configuration selector 440 of FIG. 6.

The processor 1312 of the illustrated example includes a local memory 1313 (e.g., a cache). The processor 1312 of the illustrated example is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), and/or a peripheral component interconnect (PCI) express interface.

One or more output devices 1324 are connected to the interface circuit 1320 of the illustrated example. The output devices 1324 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1320 of the illustrated example, thus, typically includes a graphics driver card, a graphics driver chip and/or a graphics driver processor. The output device 1324 implements the example presentation device 455 of FIG. 6.

The interface circuit 1320 of the illustrated example also includes a communication device such as a transmitter, a receiver, a transceiver, a modem and/or network interface card to facilitate exchange of data with external machines (e.g., computing devices of any kind) such as the data acquisition system 124 of FIGS. 1-6 via a network 1326 (e.g., an Ethernet connection, a digital subscriber line (DSL), a telephone line, coaxial cable, a cellular telephone system, etc.). The interface circuit 1320 implements the example transmitter 430 of FIG. 6. The network 1326 implements the example network 435 of FIG. 6.

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, redundant array of independent disks (RAID) systems, and DVD drives. The mass storage device 1328 implements the example database 450 of FIG. 6.

Coded instructions 1332 to implement the methods of FIGS. 7-9 may be stored in the mass storage device 1328, in the volatile memory 1314, in the non-volatile memory 1316, and/or on a removable non-transitory computer readable storage medium such as a CD or DVD.

From the foregoing, it will be appreciated that example methods, apparatus and articles of manufacture have been disclosed that generate an acoustic emission spectrum using chirp demodulation. The above-disclosed integrated acoustic emission sensor apparatus and integrated acoustic emission pre-amplifier apparatus reduce the need for high-speed sampling and extensive post processing operations to produce demodulated acoustic emission data. By integrating an acoustic emission demodulator (AED) apparatus into an acoustic emission sensor and/or an acoustic emission pre-amplifier, frequency information corresponding to a continuous acoustic emission source can be generated without digitally sampling the continuous acoustic emissions at high rates. In addition, by integrating the above-disclosed AED apparatus into the acoustic emission sensor and/or the acoustic emission pre-amplifier, available processing power and/or memory resources can be reduced or reallocated to complete additional computing tasks.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An integrated acoustic emission sensor comprising:
   a pre-amplifier to condition an acoustic emission signal to generate a pre-amplified acoustic emission signal, the acoustic emission signal based on an acoustic emission source;
   a demodulator to:
      generate a chirp signal based on at least one of a start frequency, an end frequency, or a sweep time;
      combine the pre-amplified acoustic emission signal with the chirp signal to generate a sideband acoustic emission signal;
      sample spectral data of the sideband acoustic emission signal at an intermediate center frequency in an intermediate frequency bandwidth; and
      generate demodulated acoustic emission data based on mapping the sampled spectral data to a measurement center frequency to generate a low-resolution and high-bandwidth spectrum, the measurement center frequency different from the intermediate center frequency; and
   a transmitter to transmit the demodulated acoustic emission data to a data acquisition system.

2. The integrated acoustic emission sensor of claim 1, wherein the pre-amplifier includes an amplifier to strengthen the acoustic emission signal and a filter to remove frequency information not within a frequency bandwidth.

3. The integrated acoustic emission sensor of claim 1, the demodulator further including:
   a chirp generator to generate the chirp signal based on at least one of the start frequency, the end frequency, or the sweep time; and
   a mixer to combine the chirp signal with the acoustic emission signal to generate mixed acoustic emission data, the mixed acoustic emission data including the sideband acoustic emission signal; and
   a data extractor to:
      filter the mixed acoustic emission data based on a filter bandwidth to generate filtered mixed acoustic emission data; and
      convert the filtered mixed acoustic emission data to the demodulated acoustic emission data.

4. The integrated acoustic emission sensor of claim 1, wherein the demodulated acoustic emission data includes at least one of the spectral data or time-averaged data to characterize the acoustic emission source during a measurement time period, the spectral data or the time-averaged data including at least one of a voltage amplitude, an energy value, or a frequency value, and the demodulator further including a data extractor to generate an alert in response to the at least one of the voltage amplitude, the energy value, or the frequency value satisfying a threshold.

5. The integrated acoustic emission sensor of claim 1, wherein data the demodulator further includes:
- a chirp generator to generate the chirp signal at a first instantaneous frequency;
- a mixer to combine (1) the chirp signal at the first instantaneous frequency and (2) the pre-amplified acoustic emission signal corresponding to a measurement bandwidth to generate the sideband acoustic emission signal, the sideband acoustic emission signal shifted away from the measurement bandwidth based on the first instantaneous frequency;
- a data extractor to sample the spectral data at the intermediate center frequency, the intermediate center frequency based on the first instantaneous frequency and the measurement bandwidth; and
- a configuration selector to select the measurement bandwidth.

6. The integrated acoustic emission sensor of claim 1, further including a configuration selector to adjust a parameter of at least one of the pre-amplifier or the demodulator by at least one of modifying a gain of an amplifier, a bandwidth of a filter, a start frequency value of a chirp generator, an end frequency value of the chirp generator, a sweep time value of the chirp generator, or a communication parameter of the transmitter.

7. The integrated acoustic emission sensor of claim 1, further including a presentation device to display the demodulated acoustic emission data.

8. A method comprising:
- conditioning an acoustic emission signal based on an acoustic emission source with a pre-amplifier integrated into an acoustic emission sensor to generate a pre-amplified acoustic emission signal;
- generating a chirp signal based on at least one of a start frequency, an end frequency, or a sweep time;
- combining the pre-amplified acoustic emission signal with the chirp signal to generate a sideband acoustic emission signal;
- sampling spectral data of the sideband acoustic emission signal at an intermediate center frequency in an intermediate frequency bandwidth;
- generating demodulated acoustic emission data based on mapping the sampled spectral data to a measurement center frequency to generate a low-resolution and high-bandwidth spectrum, the measurement center frequency different from the intermediate center frequency; and
- transmitting the demodulated acoustic emission data to a data acquisition system.

9. The method of claim 8, wherein conditioning the acoustic emission signal includes at least one of strengthening the acoustic emission signal with an amplifier or removing frequency information not within a frequency bandwidth with a filter.

10. The method of claim 8, wherein the demodulated acoustic emission data includes at least one of the spectral data or time-averaged data to characterize the acoustic emission source during a measurement time period, the spectral data or the time-averaged data including at least one of a voltage amplitude, an energy value, or a frequency value, and further including generating an alert in response to the at least one of the voltage amplitude, the energy value, or the frequency value satisfying a threshold.

11. The method of claim 8, further including:
- selecting a measurement bandwidth of the pre-amplified acoustic emission signal;
- combining (1) the chirp signal at a first instantaneous frequency and (2) the pre-amplified acoustic emission signal corresponding to the measurement bandwidth to generate the sideband acoustic emission signal, the sideband acoustic emission signal shifted away from the measurement bandwidth based on the first instantaneous frequency; and
- sampling the spectral data at the intermediate center frequency, the intermediate center frequency based on the first instantaneous frequency and the measurement bandwidth.

12. The method of claim 8, further including adjusting a parameter of at least one of the pre-amplifier or a demodulator by at least one of modifying a gain of an amplifier, a bandwidth of a filter, a start frequency value of a chirp generator, an end frequency value of the chirp generator, a sweep time value of the chirp generator, or a communication parameter of a transmitter.

13. The method of claim 8, further including:
- obtaining a first value for a parameter from the data acquisition system;
- comparing the first value to a second value for the parameter stored in a database included in the acoustic emission sensor; and
- replacing the second value with the first value in the database when the first and the second values are different.

14. The method of claim 8, further including displaying the demodulated acoustic emission data on a presentation device included in the acoustic emission sensor.

15. A non-transitory computer readable storage medium comprising instructions which, when executed, cause a machine to at least:
- condition an acoustic emission signal based on an acoustic emission source with a pre-amplifier integrated into an acoustic emission sensor to generate a pre-amplified acoustic emission signal;
- generate a chirp signal based on at least one of a start frequency, an end frequency, or a sweep time;
- combine the pre-amplified acoustic emission signal with the chirp signal to generate a sideband acoustic emission signal;
- sample spectral data of the sideband acoustic emission signal at an intermediate center frequency in an intermediate frequency bandwidth;
- generate demodulated acoustic emission data based on mapping the sampled spectral data to a measurement center frequency to generate a low-resolution and high-bandwidth spectrum, the measurement center frequency different from the intermediate center frequency; and
- transmit the demodulated acoustic emission data to a data acquisition system.

16. The non-transitory computer readable storage medium of claim 15, wherein conditioning the acoustic emission signal includes at least one of strengthening the acoustic emission signal with an amplifier or removing frequency information not within a frequency bandwidth with a filter.

17. The non-transitory computer readable storage medium of claim 15, wherein the demodulated acoustic emission data includes at least one of the spectral data or time-averaged data to characterize the acoustic emission source during a measurement time period, the spectral data or the time-averaged data including at least one of a voltage amplitude, an energy value, or a frequency value, and the instructions, when executed, cause the machine to at least generate an alert in response to the at least one of the voltage amplitude, the energy value, or the frequency value satisfying a threshold.

18. The non-transitory computer readable storage medium of claim 15, wherein the instructions, when executed, cause the machine to at least:
   select a measurement bandwidth of the pre-amplified acoustic emission signal;
   combine (1) the chirp signal at a first instantaneous frequency and (2) the pre-amplified acoustic emission signal corresponding to the measurement bandwidth to generate the sideband acoustic emission signal, the sideband acoustic emission signal shifted away from the measurement bandwidth based on the first instantaneous frequency; and
   sample the spectral data at the intermediate center frequency, the intermediate center frequency based on the first instantaneous frequency and the measurement bandwidth.

19. The non-transitory computer readable storage medium of claim 15, wherein the instructions, when executed, cause the machine to at least adjust a parameter of at least one of the pre-amplifier or a demodulator by at least one of modifying a gain of an amplifier, a bandwidth of a filter, a start frequency value of a chirp generator, an end frequency value of the chirp generator, a sweep time value of the chirp generator, or a communication parameter of a transmitter.

20. The non-transitory computer readable storage medium of claim 15, wherein the instructions, when executed, cause the machine to at least:
   obtain a first value for a parameter from the data acquisition system;
   compare the first value to a second value for the parameter stored in a database included in the acoustic emission sensor; and
   replace the second value with the first value in the database when the first and the second values are different.

21. The non-transitory computer readable storage medium of claim 15, wherein the instructions, when executed, cause the machine to at least display the demodulated acoustic emission data on a presentation device included in the acoustic emission sensor.

* * * * *